(12) United States Patent
Kumari et al.

(10) Patent No.: US 12,339,387 B2
(45) Date of Patent: Jun. 24, 2025

(54) GI-FMCW RADAR REFERENCE SIGNAL DESIGN FOR JOINT COMMUNICATION-RADAR

(71) Applicant: QUALCOMM Incorporated, San Diego, CA (US)

(72) Inventors: Preeti Kumari, San Diego, CA (US); Stelios Stefanatos, San Diego, CA (US); Junyi Li, Fairless Hills, PA (US); Kapil Gulati, Belle Mead, NJ (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 448 days.

(21) Appl. No.: 17/661,864

(22) Filed: May 3, 2022

(65) Prior Publication Data

US 2023/0358853 A1 Nov. 9, 2023

(51) Int. Cl.
| | | |
|---|---|---|
| G01S 7/00 | (2006.01) | |
| G01S 13/00 | (2006.01) | |
| G01S 13/32 | (2006.01) | |
| H04L 27/26 | (2006.01) | |

(52) U.S. Cl.
CPC ............ *G01S 7/006* (2013.01); *G01S 13/003* (2013.01); *G01S 13/325* (2013.01); *H04L 27/261* (2013.01)

(58) Field of Classification Search
CPC ...... G01S 7/006; G01S 13/003; G01S 13/325; H04L 27/261
See application file for complete search history.

(56) References Cited

U.S. PATENT DOCUMENTS

| | | | | |
|---|---|---|---|---|
| 8,848,827 | B2 * | 9/2014 | Hiscock | H04B 17/382 |
| | | | | 455/39 |
| 9,239,378 | B2 * | 1/2016 | Kishigami | G01S 7/0233 |
| 9,664,777 | B2 * | 5/2017 | Kishigami | G01S 7/023 |
| 9,897,685 | B2 * | 2/2018 | Ossowska | G01S 7/023 |
| 10,082,562 | B1 * | 9/2018 | Abari | G01S 13/48 |
| 10,234,540 | B2 * | 3/2019 | Kim | G01S 13/343 |
| 10,365,349 | B2 * | 7/2019 | Kishigami | G01S 7/023 |
| 10,514,442 | B2 * | 12/2019 | Lim | G01S 13/284 |
| 10,623,075 | B2 * | 4/2020 | Pratt | H04B 7/0617 |
| 10,739,438 | B2 * | 8/2020 | Harrison | G01S 13/726 |
| 10,855,328 | B1 * | 12/2020 | Gulati | G01S 7/0234 |
| 10,955,547 | B2 * | 3/2021 | Ray | G01S 7/003 |
| 11,073,598 | B2 * | 7/2021 | Gulati | G01S 13/931 |
| 11,109,388 | B2 * | 8/2021 | Wu | H04W 74/0808 |
| 11,385,323 | B2 * | 7/2022 | Gulati | H04J 13/0062 |

(Continued)

*Primary Examiner* — Peter M Bythrow
(74) *Attorney, Agent, or Firm* — Procopio, Cory, Hargreaves & Savitch LLP

(57) ABSTRACT

Aspects presented herein may improve joint communication-radar system by providing a radar reference signal with GI-FMCW waveform. Aspects presented herein may be compatible with communication-centric waveforms and thereby may apply to UEs or network entities with minimal changes if specified. In one aspect, a wireless device transmits a set of communication signals. The wireless device configure one or more parameters associated with a set of radar reference signals for radar sensing based on the set of communication signals, each radar reference signal in the set of radar reference signals including a guard interval. The wireless device transmits the set of radar reference signals associated with the one or more parameters.

29 Claims, 27 Drawing Sheets

(56) References Cited

U.S. PATENT DOCUMENTS

| | | | | |
|---|---|---|---|---|
| 11,460,539 | B2* | 10/2022 | Engewald | G01S 7/023 |
| 11,513,187 | B2* | 11/2022 | Stettiner | G01S 7/2883 |
| 11,520,003 | B2* | 12/2022 | Stettiner | G01S 7/0232 |
| 11,585,919 | B2* | 2/2023 | Gulati | G01S 13/343 |
| 11,644,529 | B2* | 5/2023 | Gulati | G01S 13/343 |
| | | | | 342/173 |
| 11,656,322 | B2* | 5/2023 | Aydogdu | G01S 13/343 |
| | | | | 342/60 |
| 12,019,143 | B2* | 6/2024 | Beg | G01S 13/56 |
| 2014/0035774 | A1* | 2/2014 | Khlifi | G01S 7/006 |
| | | | | 342/21 |
| 2016/0334501 | A1* | 11/2016 | Ling | G01S 13/931 |
| 2017/0153314 | A1* | 6/2017 | Siemes | G08G 1/161 |
| 2018/0019797 | A1* | 1/2018 | Khan | H04B 7/0689 |
| 2018/0365975 | A1* | 12/2018 | Xu | G08B 29/185 |
| 2019/0056476 | A1* | 2/2019 | Lin | G01S 7/021 |
| 2019/0219683 | A1* | 7/2019 | Fang | G01S 13/93 |
| 2019/0250261 | A1* | 8/2019 | Itkin | H04B 1/44 |
| 2019/0293748 | A1* | 9/2019 | Gulati | G01S 7/023 |
| 2019/0383925 | A1* | 12/2019 | Gulati | G01S 13/341 |
| 2019/0391247 | A1* | 12/2019 | Gulati | G01S 13/341 |
| 2020/0025866 | A1* | 1/2020 | Gulati | G01S 13/931 |
| 2020/0028656 | A1* | 1/2020 | Gulati | G01S 13/343 |
| 2020/0033442 | A1* | 1/2020 | Gulati | H04K 1/00 |
| 2020/0052941 | A1* | 2/2020 | Lang | G01S 7/352 |
| 2020/0116817 | A1* | 4/2020 | Chuo | H04L 27/2627 |
| 2020/0309933 | A1* | 10/2020 | Ray | G01S 13/282 |
| 2020/0319327 | A1* | 10/2020 | Tsvelykh | G01S 13/933 |
| 2021/0041530 | A1* | 2/2021 | Jeong | G01S 13/325 |
| 2022/0404456 | A1* | 12/2022 | Gottinger | G01S 13/58 |
| 2024/0098677 | A1* | 3/2024 | Takeda | G01S 13/765 |

* cited by examiner

700A

Monostatic Sensing

700B

Bistatic Sensing

CP-OFDM Waveform

| CP | Xn-1 | CP | Xn | |
|---|---|---|---|---|

| CP-OFDM Parameter | Value |
|---|---|
| Carrier Frequency | 73 GHz |
| FFT Size | 4096 |
| SCS | 240 kHz |
| RRS | PRS |
| Symbol Duration (without CP) | 1/240e3 sec = 4.17 µs |
| CP duration | 0.3 µs |
| Noise PSD dBm/Hz | -174 |

1300

GI-FMCW Waveform

| X0 | GI | X0 | GI |
|---|---|---|---|

| CP-OFDM Parameter | Value |
|---|---|
| Carrier Frequency | 73 GHz |
| FFT Size | 4096 |
| RRS | FMCW |
| Tup | 1/240e3 sec = 4.17 µs |
| Toff | 0.3 µs |
| Noise PSD dBm/Hz | -174 |

FIG. 13

CP-OFDM Waveform

| CP | Xn-1 | CP | Xn |
|---|---|---|---|

| CP-OFDM Parameter | Value |
|---|---|
| Carrier Frequency | 73 GHz |
| FFT Size | 4096 |
| SCS | 240 kHz |
| RRS | PRS |
| Symbol Duration (without CP) | 1/240e3 sec = 4.17 µs |
| CP duration | 0.3 µs |
| Noise PSD dBm/Hz | -174 |

GI-FMCW Waveform

| X0 | GI | X0 | GI |
|---|---|---|---|

| CP-OFDM Parameter | Value |
|---|---|
| Carrier Frequency | 73 GHz |
| FFT Size | 4096 |
| RRS | FMCW |
| Tup | 1/240e3 sec = 4.17 µs |
| Toff | 0 |
| Noise PSD dBm/Hz | -174 |

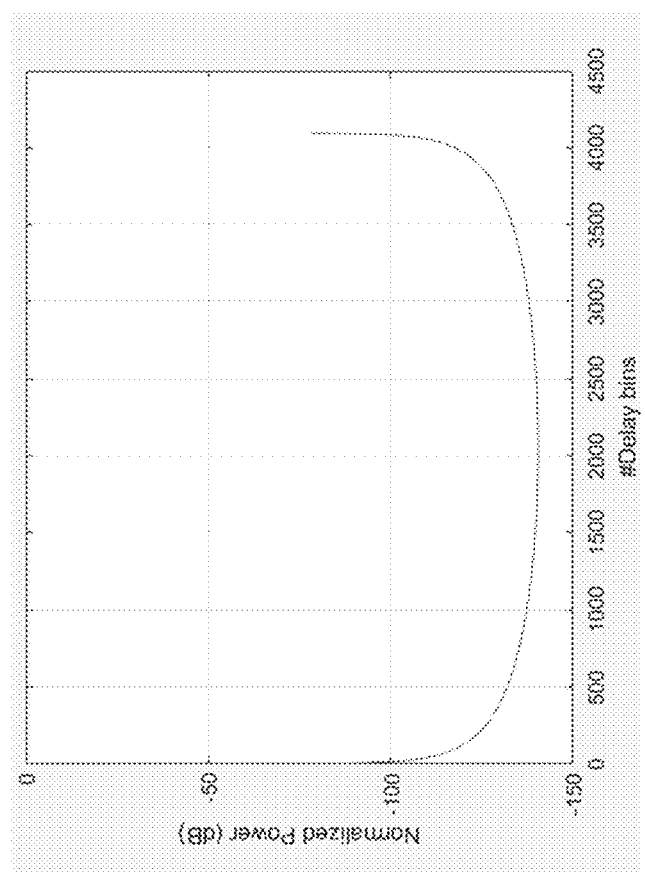
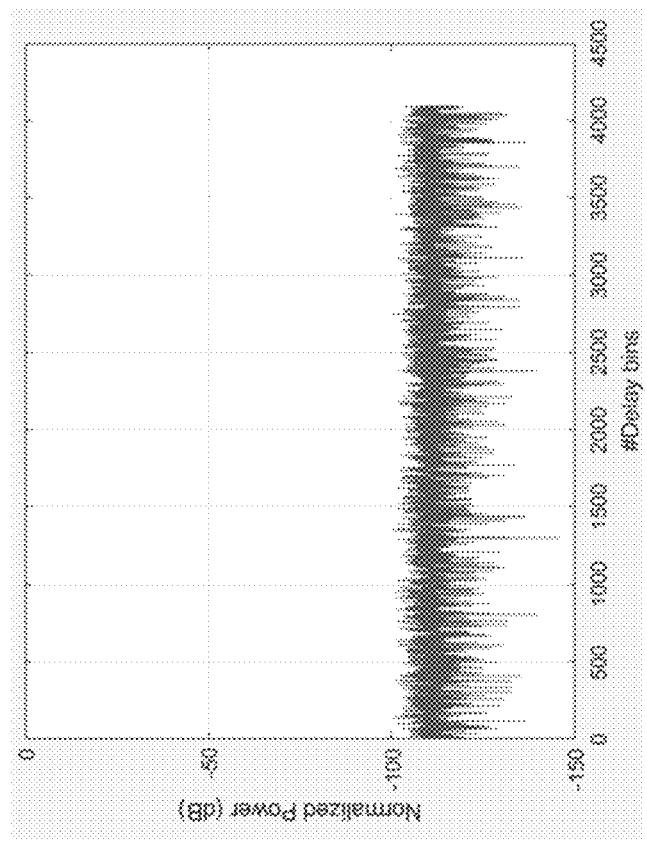
FIG. 19

| Parameters | Traditional FMCW Radar | GI-FMCW Radar of the Present Disclosure |
|---|---|---|
| Tx hardware reuse | No | Yes |
| DAC Sampling rate | Low | High |
| Standards compliant and need of codebook support (restricted configurations) | No (Currently no standard exits for radar waveforms). Most traditional radar operate independently with proprietary waveforms. | Yes, needs to be NR-compliant. Codebook support (restricted configurations) needed to be NR-compatible with low-overhead. Additionally, this will allow seamless integration with other NR waveforms and other communication needs. |
| Frequency bands | Traditional radar bands, such as 77-81 GHz, Additional JCR bands | Communication bands (FR1, FR2, FR2x, etc.), Additional JCR bands |
| Communication support | Can support low-data rate communication by exploiting phase-coded FMCW design. The radar and communication co-existence will be handled at the upper layer. | Can support high-data rate communication by exploiting phase-coded FMCW design. Additionally, the proposed waveform will allow seamless and low-overhead integration with other high-data rate NR waveforms at the physical layer. |
| Number of digital Tx chains and antenna architecture | Number of Tx digital chains can be high due to low-speed DAC to support MIMO radar processing. | Generally, support analog beamforming or hybrid beamforming with only a few RF chains. Can support virtual TDM-MIMO if configured specifically for it by Rx UE (e.g., first Tx is on for a specific time and then second Tx (separated by first Tx with integer multiple of wavelength/2) is on for a given number of chirps). |

FIG. 21

| Parameters | Analog + BB processing, similar to traditional FMCW radar | Fully BB processing |
|---|---|---|
| Sampling rate | Low | High |
| Range-velocity trade-off | Poor | Excellent |
| Interference suppression | High | Low |
| Full-duplex interference | Low | High unless special techniques are incorporated |
| Computational complexity | Low | High |
| Number of digital Tx/Rx chains | High (leading to better angular estimation performance) | Low |
| Rx hardware reuse | No | Yes |

$$R_{max} \propto f_s T_c \quad v_{max} \propto 1/T_c$$

FIG. 22

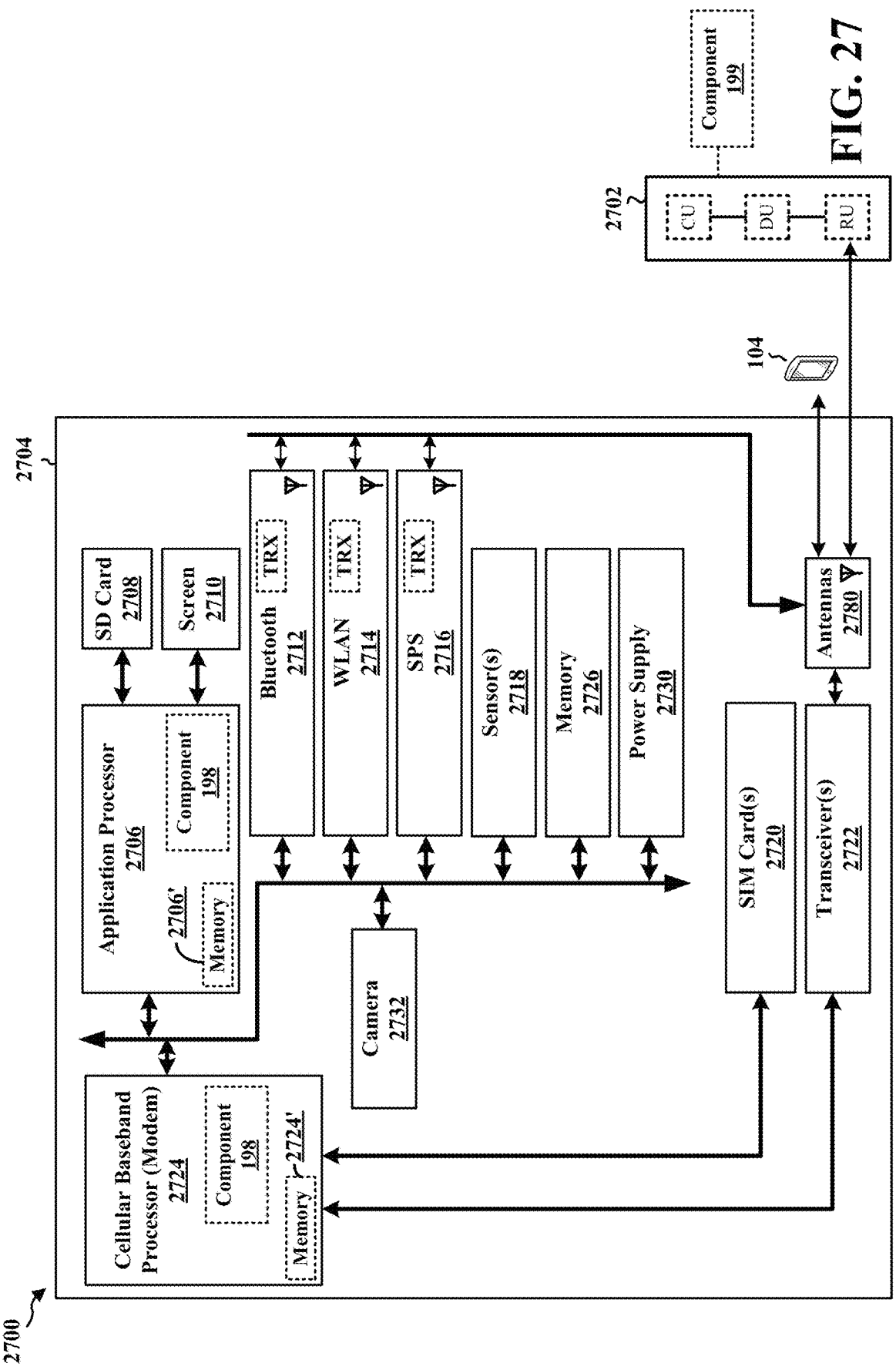

GI-FMCW RADAR REFERENCE SIGNAL DESIGN FOR JOINT COMMUNICATION-RADAR

TECHNICAL FIELD

The present disclosure relates generally to communication systems, and more particularly, to radio frequency (RF) sensing.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus transmits a set of communication signals. The apparatus configures one or more parameters associated with a set of radar reference signals for radar sensing based on the set of communication signals, each radar reference signal in the set of radar reference signals including a guard interval (GI). The apparatus transmits the set of radar reference signals associated with the one or more parameters.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 13 is a diagram illustration an example comparison between GI-FMCW and CP-OFDM for same length of GI and CP in accordance with various aspects of the present disclosure.

FIG. 16 is a diagram illustration an example comparison between GI-FMCW without GI and CP-OFDM in accordance with various aspects of the present disclosure.

FIG. 19 is a diagram illustration an example comparison between GI-FMCW and CP-OFDM in accordance with various aspects of the present disclosure.

FIG. 21 is a diagram illustrating an example comparison between FMCW waveform and the GI-FMCW waveform described herein from a transmission perspective in accordance with various aspects of the present disclosure.

FIG. 22 is a diagram illustrating an example comparison between analog and baseband FMCW Rx processing in accordance with various aspects of the present disclosure.

FIG. 27 is a diagram illustrating an example of a hardware implementation for an example apparatus and/or network entity.

DETAILED DESCRIPTION

Figure 1:
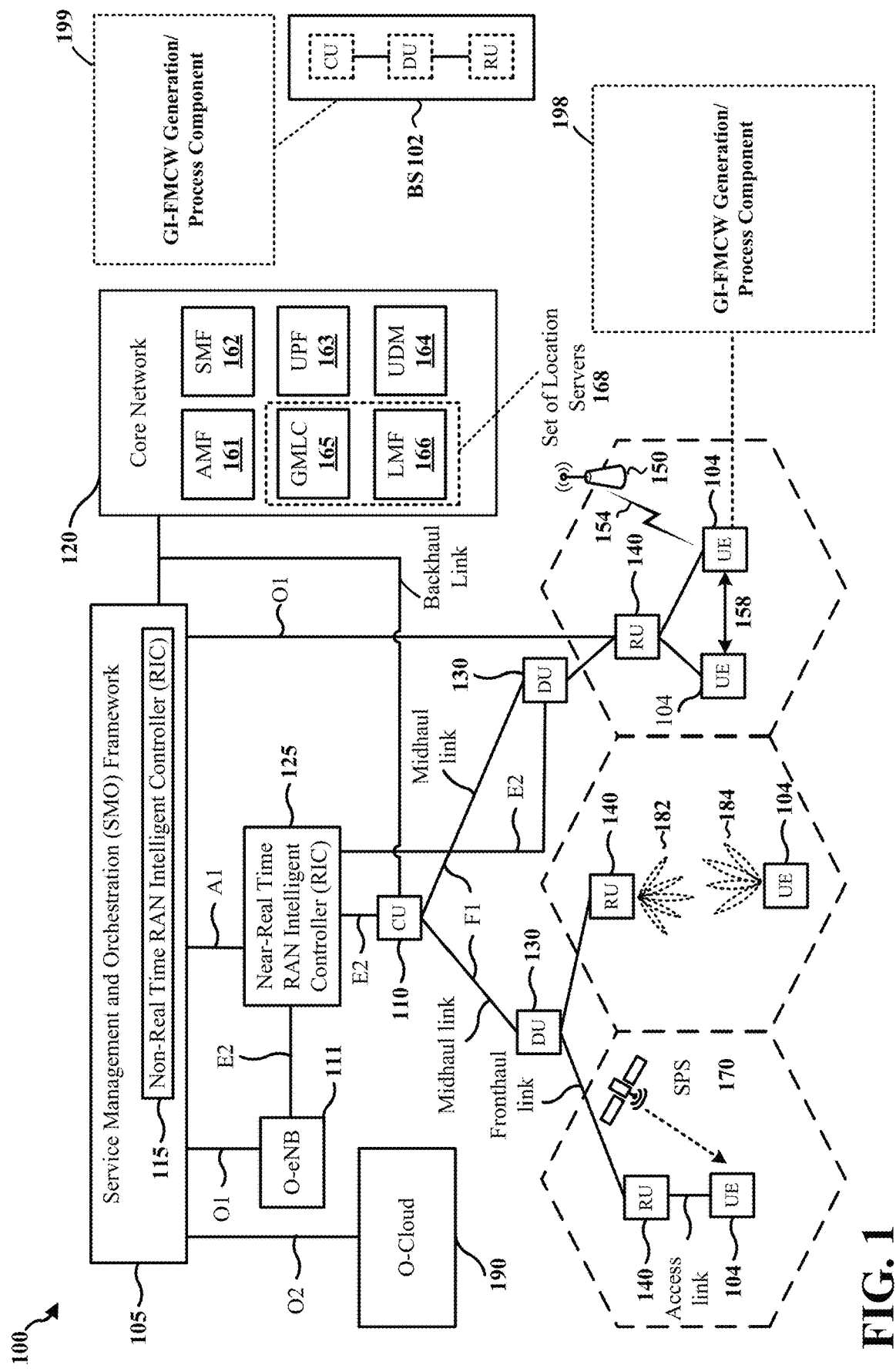
FIG. 1 is a diagram illustrating an example of a wireless communications system and an access network.

Aspects presented herein may improve joint communication-radar (JCR) system by providing a radar reference signal (RRS) with guard interval (GI)-frequency-modulated continuous-wave (FMCW) waveform (e.g., FMCW waveform with GI). Aspects presented herein may be compatible with communication-centric waveforms and thereby may apply to UEs or network entities with minimal changes if specified. Aspects presented herein may also provide signaling specification changes specified to support and configure the RRS design with guard interval-frequency modulated continuous wave (GI-FMCW) waveform for monostatic and bi-static sensing modes.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit.

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface).

For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, an RF sensing node, which may be a UE 104 or a base station 102/180, may include a GI-FMCW generation/process component 198/199 configured to perform JCR based on using GI-FMCW waveforms for RF sensing. In one configuration, the GI-FMCW generation/process component 198/199 may be configured to transmit a set of communication signals. In such configuration, the GI-FMCW generation/process component 198/199 may configure one or more parameters associated with a set of radar reference signals for radar sensing based on the set of communication signals, each radar reference signal in the set of radar reference signals including a GI. In such configuration, the GI-FMCW generation/process component 198/199 may transmit the set of radar reference signals associated with the one or more parameters.

Figure 2:
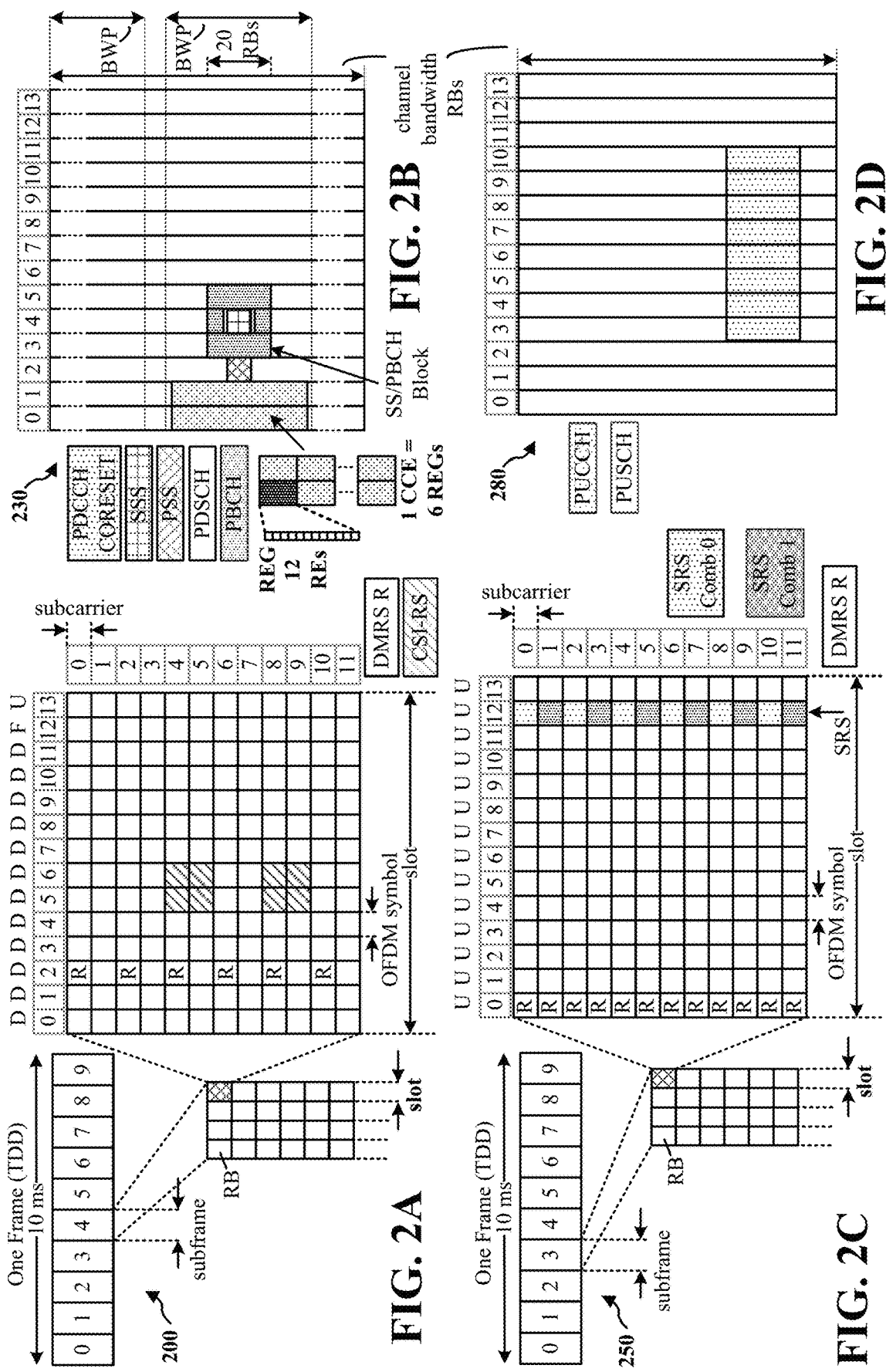
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^\mu \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
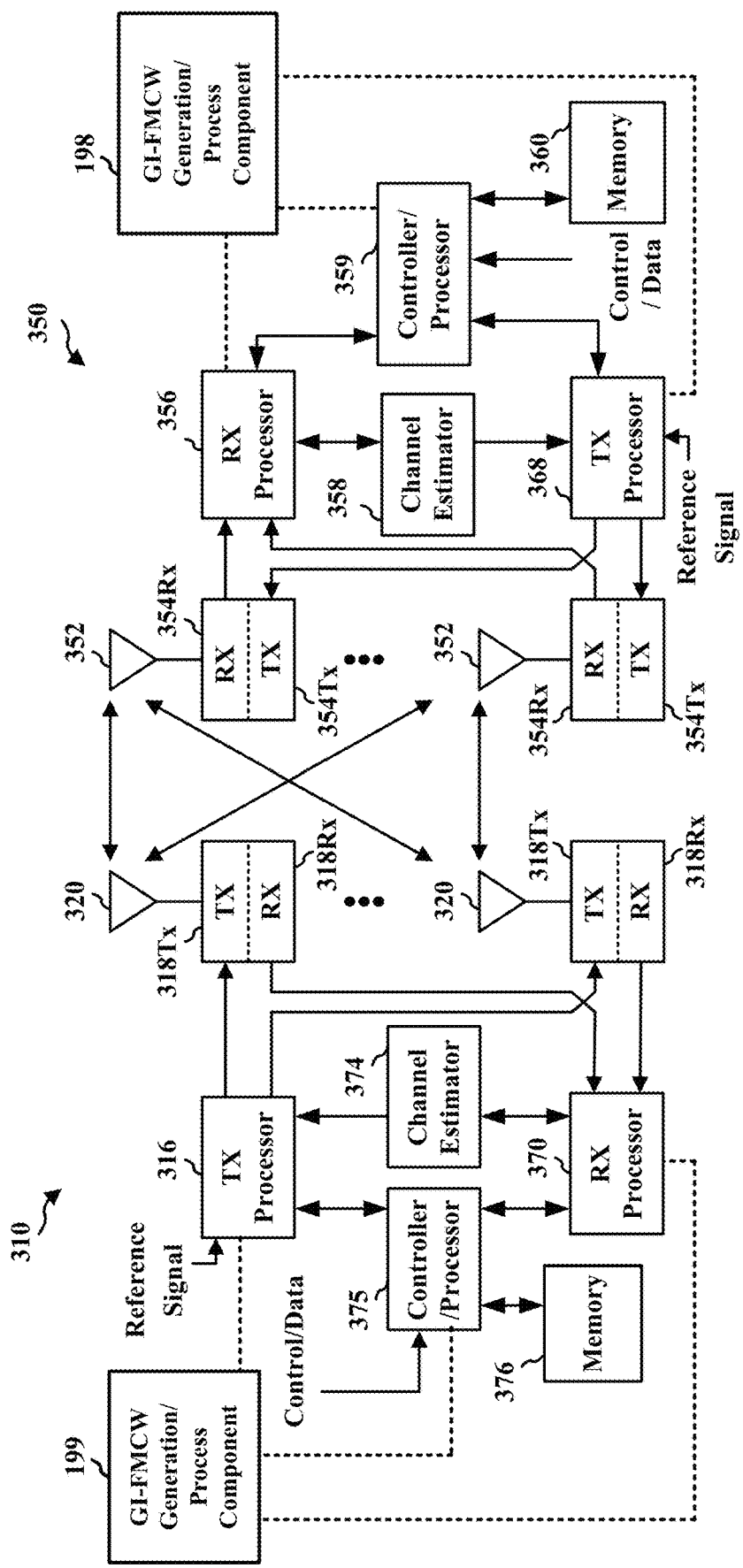
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the GI-FMCW generation/process component 198 of FIG. 1.

At least one of the TX processor 316, the RX processor 370, and the controller/processor 375 may be configured to perform aspects in connection with the GI-FMCW generation/process component 199 of FIG. 1.

Figure 4:
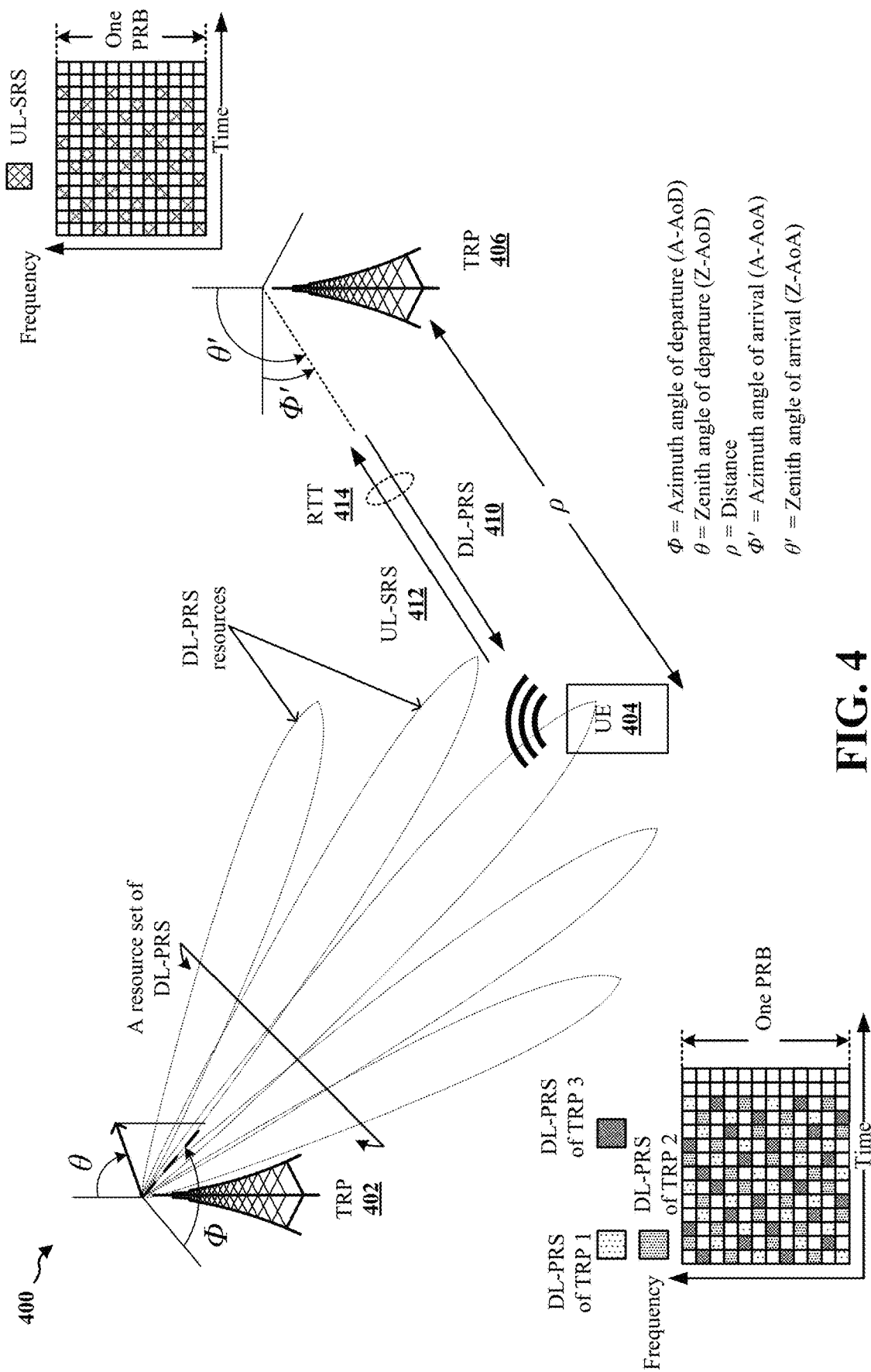
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $||T_{SRS\_RX}-T_{PRS\_TX}|-|T_{SRS\_TX}-T_{PRS\_RX}||$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx-Tx time difference measurements (and/or DL-PRS-RSRP of the received signals) using assistance data received from the positioning server, and the TRPs 402, 406 measure the gNB Rx-Tx time difference measurements (and/or UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and/or DL-PRS-RSRP) of downlink signals received from multiple TRPs 402, 406 at the UE 404. The UE 404 measures the DL RSTD (and/or DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and/or UL-SRS-RSRP) at multiple TRPs 402, 406 of uplink signals transmitted from UE 404. The TRPs 402, 406 measure the UL-RTOA (and/or UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

In addition to network-based UE positioning technologies, a wireless device (e.g., a base station, a component of the base station, a UE, etc.) may also be configured to include radar capabilities, which may be referred to as "radio frequency (RF) sensing" and/or "cellular-based RF sensing." For example, a wireless device may transmit radar reference signals (RRSs) and measure the RRSs reflected from one or more objects. Based at least in part on the measurement, the wireless device may determine or estimate a distance between the wireless device and the one or more objects. In another example, a first wireless device may also receive RRSs transmitted from a second wireless device, where the first wireless device may determine or estimate a distance between the first wireless device and the second wireless device based at least in part on the received RRS. As such, in some examples, RF sensing techniques may be used for UE positioning and/or for assisting UE positioning. For purposes of the present disclosure, a device that is capable of performing RF sensing (e.g., transmitting and/or receiving RRS for detecting an object or for estimating the distance between the device and the object) may be referred to as an "RF sensing node." For example, an RF sensing node may be a UE, a base station, a component of the base station, a TRP, a device capable of transmitting RRS, and/or a device configured to perform radar functions, etc.

Figure 5:
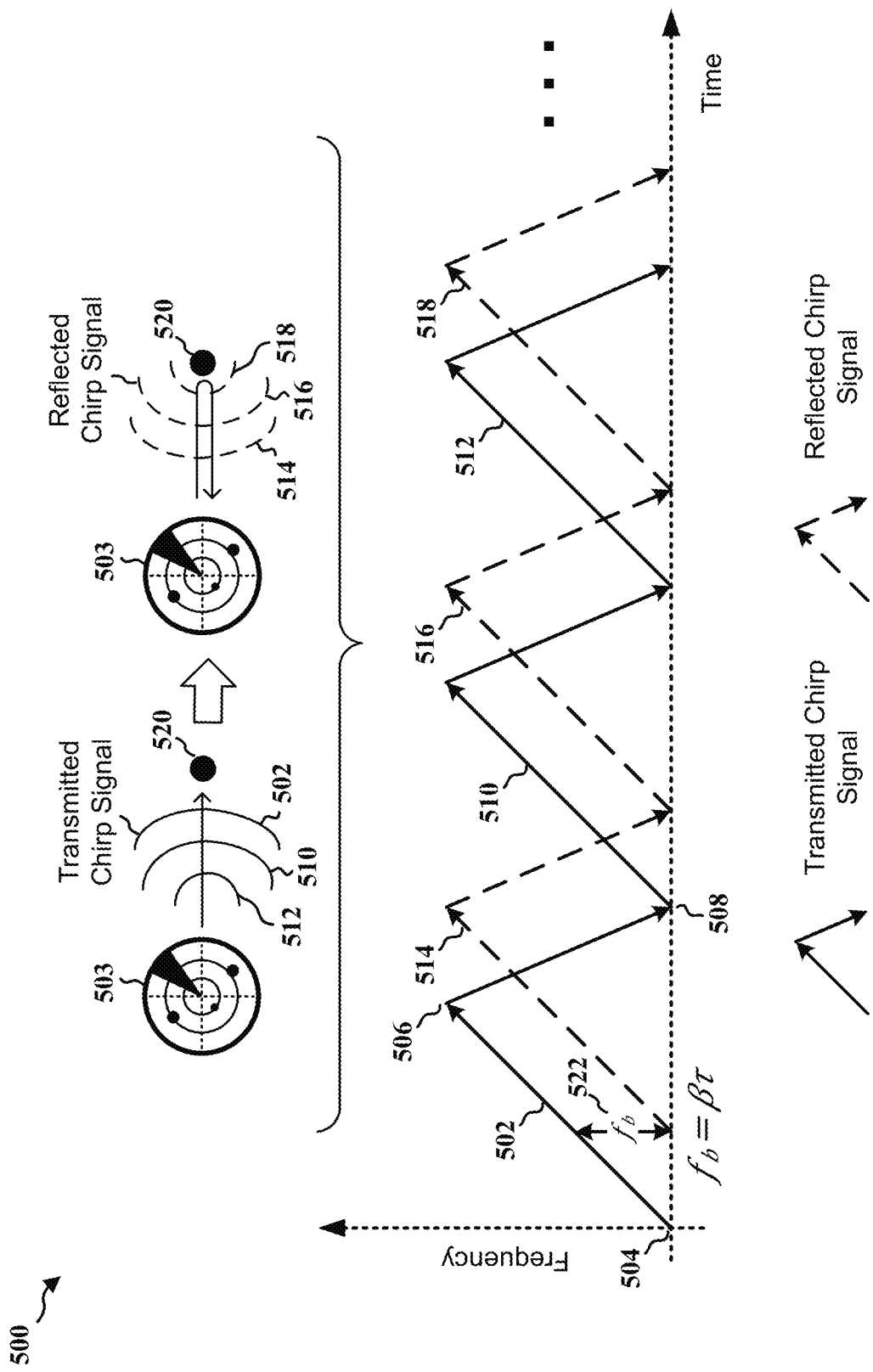
FIG. 5 is a diagram illustrating an example of radar signals (e.g., radar reference signals (RRSs)) generated from a wireless device in accordance with various aspects of the present disclosure.

FIG. 5 is a diagram 500 illustrating an example radar signal (e.g., RRS) generated from an RF sensing node in accordance with various aspects of the present disclosure. An RF sensing node 503 may detect an object 520 (e.g., the location, the distance, and/or the speed of the object 520 with respect to the RF sensing node 503) by transmitting RRS towards the object 520 and receiving the RRS reflected (e.g., bounce off) from the object 520. In some examples, the object 520 may be a radar receiver or have a capability to receive and process RRS.

In one example, the RRS may be a chirp signal that includes a frequency that varies linearly (e.g., has a frequency sweeping) over a fixed period of time (e.g., over a sweep time) by a modulating signal. For example, as shown by the diagram 500, a transmitted chirp signal 502 may have a starting frequency at 504 of a sinusoid. Then, the frequency may gradually (e.g., linearly) increase on the sinusoid until it reaches an ending (or highest) frequency at 506 of the sinusoid, and then the frequency of the signal may return to the starting frequency as shown at 508 and another chirp signal 510 may be transmitted in the same way. In other words, each chirp signal may include an increase in frequency (e.g., linearly) and a drop in frequency or vice versa (e.g., including a decrease in frequency and then an increase in frequency), such that the RF sensing node 503 may transmit chirp signals sweeping in frequency. In some examples, such chirp signal may also be referred to as a frequency modulated continuous wave (FMCW).

After a chirp signal (e.g., chirp signal 502, 510, 512, etc.) is transmitted by the RF sensing node 503, the transmitted chirp signal may reach the object 520 and reflect back to the RF sensing node 503, such as shown by the reflected chirp signals 514, 516, and 518, which may correspond to the transmitted chirp signals 502, 510, and 512, respectively. As there may be a distance between the RF sensing node 503 and the object 520 and/or it may take time for a transmitted chirp signal to reach the object 520 and reflect back to the RF sensing node 503, a delay may exist between a transmitted chirp signal and its corresponding reflected chirp signal. As the delay may be proportional to a range between the RF sensing node 503 and the object 520 (e.g., the further the target, the larger the delay and vice versa), the RF sensing node 503 may be able to measure or estimate a distance between the RF sensing node 503 and the object 520 based on the delay.

In some examples, the RF sensing node 503 may also measure a difference in frequency between the transmitted chirp signal and the reflected chirp signal, which may also be proportional to the distance between the RF sensing node 503 and the object 520. In other words, as the frequency difference between the reflected chirp signal and the transmitted chirp signal increases with the delay, and the delay is linearly proportional to the range, the distance of the object 520 from the RF sensing node 503 may also be determined based on the difference in frequency. Thus, the reflected chirp signal from the object 520 may be mixed with the transmitted chirp signal and down-converted to produce a beat signal (fb) which may be linearly proportional to the range after demodulation. For example, the RF sensing node 503 may determine a beat signal 522 by mixing the transmitted chirp signal 502 and its corresponding reflected chirp signal 514. While examples in the diagram illustrate using an FMCW waveform for the RRS, other types of radar waveforms may also be used by the RF sensing node 503 for the RRS.

Due to an increased amount of bandwidth (BW) being allocated for cellular communications systems (e.g., 5G and beyond) and an increased amount of applications (e.g., use cases) being introduced with cellular communications systems, joint communication and RF sensing, which may also be referred to as joint communication-radar (JCR), may become an important feature for cellular systems. For example, a wireless device (e.g., a base station, a component of the base station, a UE, an RF sensing node, etc.) may be configured to transmit communication signals (e.g., PDSCH, PUSCH, PSSCH, etc.) with radar signals (e.g., RRS, FMCW signals, etc.) together or close in time. In addition, OFDM waveform (or its variants) may be used as the waveform for the JCR as the OFDM waveform may enable in-band multiplexing with other cellular reference signals and physical channels. As such, the radar signals may be multiplexed with communication signals based on OFDM waveform. For purposes of the present disclosure, a wireless device that performs an RF sensing based on OFDM waveform(s) or transmits RRS based on OFDM waveform(s) may be referred to as an "OFDM radar."

Figure 6A:
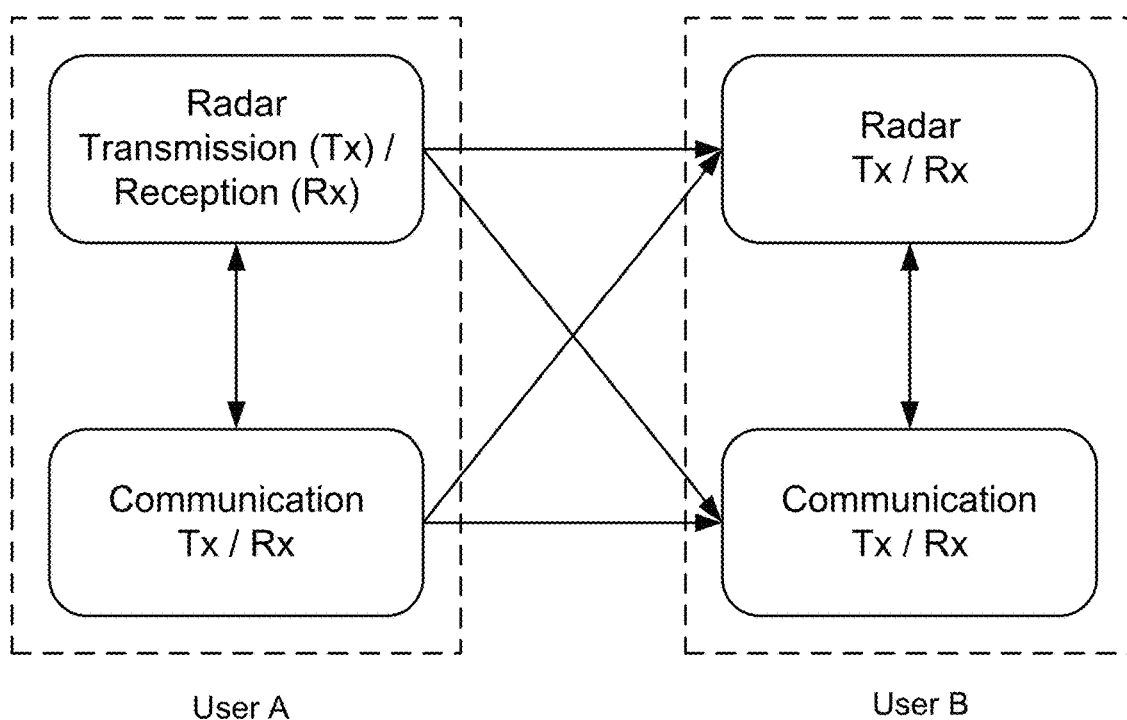
FIG. 6A is a diagram illustrating an example co-located and cooperative radar and communication system in accordance with various aspects of the present disclosure.

In some implementations, JCR systems may be categorized as co-located and cooperative radar and communication systems and co-design of communication and radar systems. FIG. 6A is a diagram 600A illustrating an example co-located and cooperative radar and communication system in accordance with various aspects of the present disclosure. For this type of JCR system, some knowledge (e.g., transmission information/configuration) is shared between the communication aspect and radar aspect of the system to improve the system's performance, without much altering the core operation of the radar and communication system. For example, as shown by the diagram 600A, each of the devices used by a first user (user A) and a second user (user B) may include a radar transmission (Tx)/reception (Rx) component that is capable of transmitting/receiving radar reference signals (RRSs) and a communication Tx/Rx component that is capable of transmitting/receiving communication signals. The radar Tx/Rx component and the communication Tx/Rx component may communicate with each to coordinate the transmission of radar signals and communication signals to other devices and/or the reception of radar signals and communication signals from other devices.

Figure 6B:
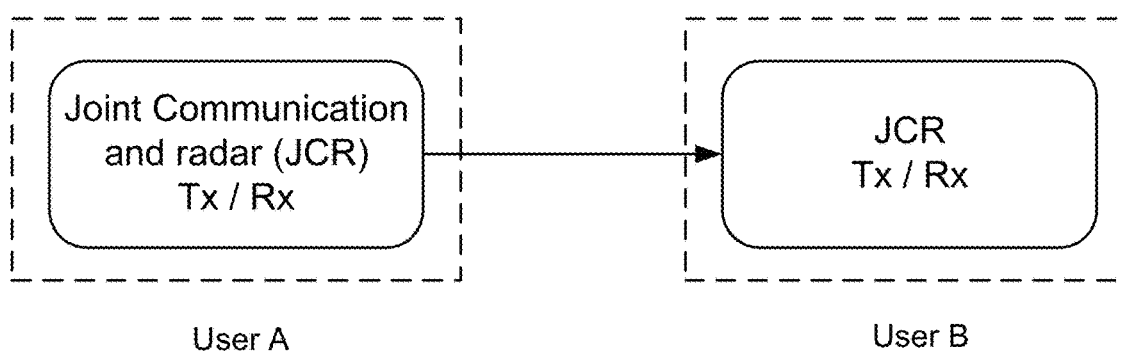
FIG. 6B is a diagram illustrating an example co-design of communication and radar system in accordance with various aspects of the present disclosure.

FIG. 6B is a diagram 600B illustrating an example co-design of communication and radar system in accordance with various aspects of the present disclosure. For this type of JCR system, as shown by the diagram 600B, a common transmitter or receiver is used for both communication and radar functionalities. This type of system may specify certain amount of modifications in the transmitting waveform generation or the receiver processing of both or either of the radar and communication systems. This type of JCR system design may provide an improved hardware and spectrum reuse. Communication-centric JCR that exploits a single communication transmission hardware may be favored by some network implementation because it may support both high-data rate communication and high-resolution sensing. For example, as described above, OFDM-based waveform may be used by the radar system for sensing purpose while remaining compatible with OFDM-based communication system.

Figure 7A:
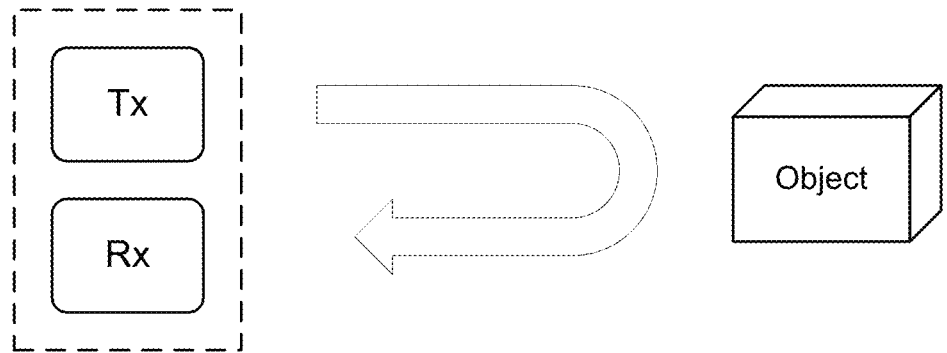
FIG. 7A is a diagram illustrating an example monostatic sensing mode in accordance with various aspects of the present disclosure.

In some implantations, RF sensing may be categorized in two types of automotive RF sensing mode: a monostatic sensing mode and a bistatic sensing mode (which may also be referred to as "monostatic RF sensing" and "bistatic RF sensing" respectively). FIG. 7A is a diagram 700A illustrating an example monostatic sensing mode in accordance with various aspects of the present disclosure. Under monostatic sensing, the transmitter and the receiver of the RF sensor are co-located, such as in the same UE or radars. Thus, the transmission and reception of the radar signals may be performed by one device. In some examples, the target delay spread in a long-range radar may be much higher than the communications due to the two-way path and long-range radar sensing specifications.

Figure 7B:
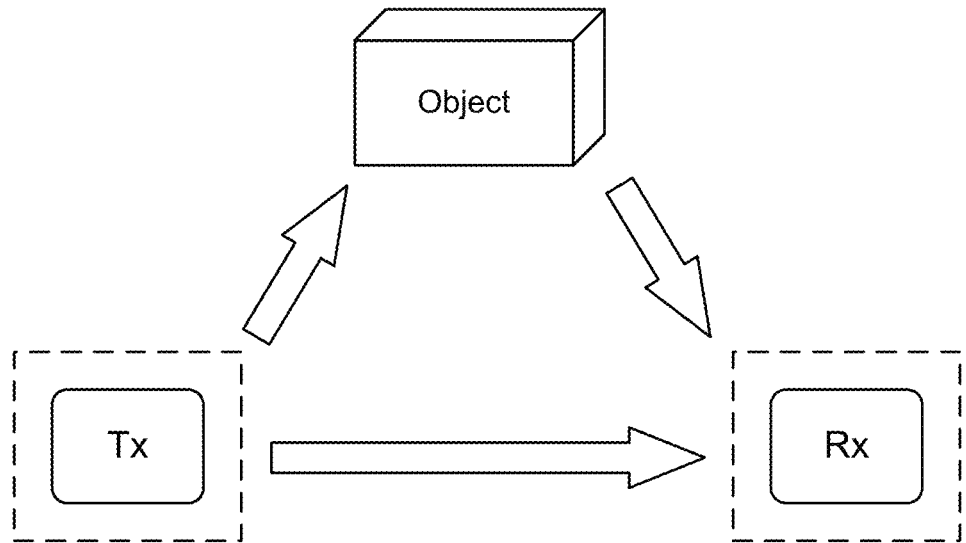
FIG. 7B is a diagram illustrating an example bistatic sensing mode in accordance with various aspects of the present disclosure.

FIG. 7B is a diagram 700B illustrating an example bistatic sensing mode in accordance with various aspects of the present disclosure. Bistatic sensing. Under bistatic sensing, the transmitter and receiver may be widely separated (e.g., on different UEs/locations). For example, the transmitter of a first device may transmit radar signals, and the radar signals (or radar signals bounced off from an object) may be received by the receiver of a second device. In one example, the bistatic sensing may be suitable for network-based UE positioning where PRS is used for the positioning. In another example, the bistatic sensing may also be suitable for channel estimation, where DMRS may be used by a device for estimating the condition of a channel.

Figure 8:
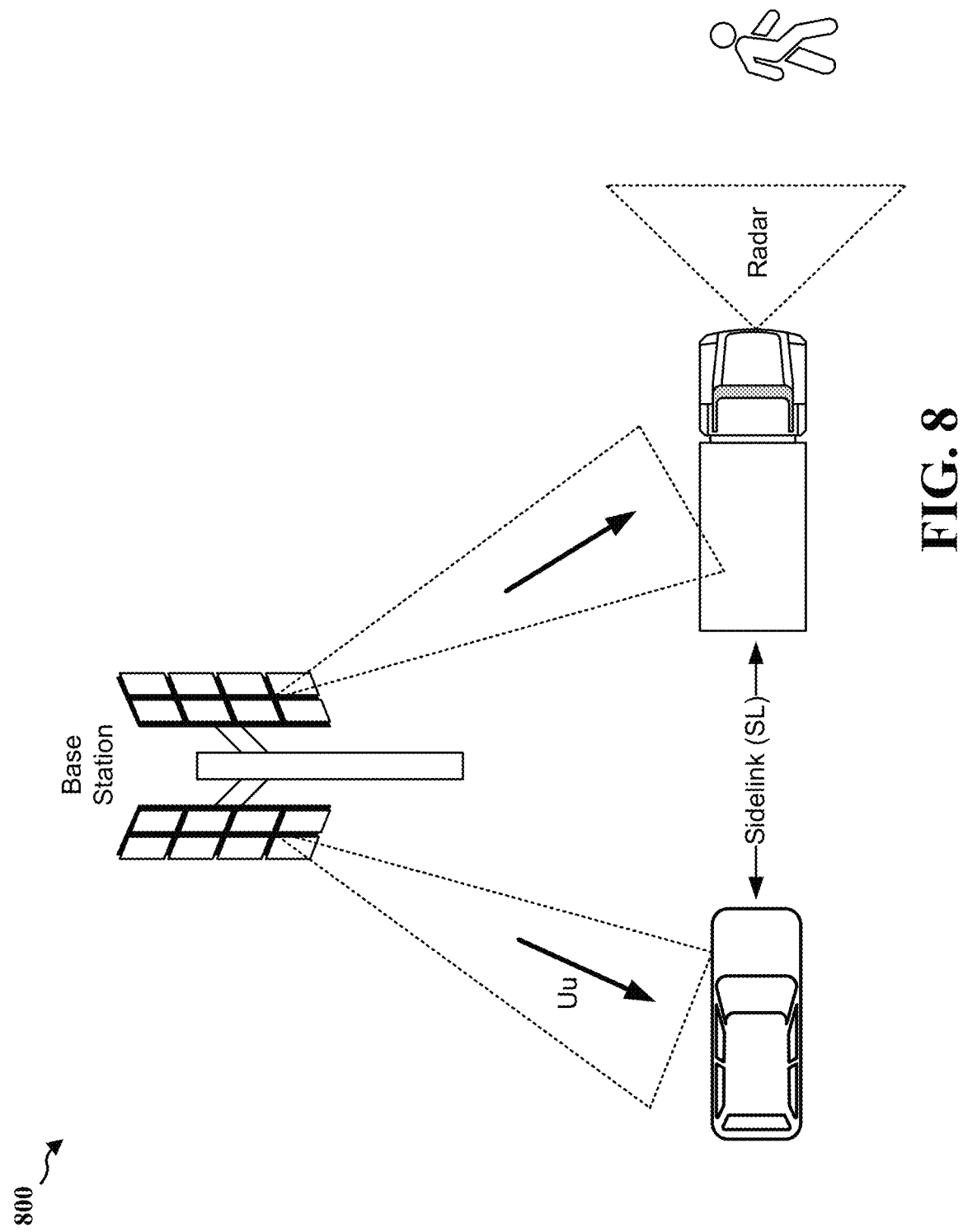
FIG. 8 is a diagram illustrating an example sensing scenario in accordance with various aspects of the present disclosure.

FIG. 8 is a diagram 800 illustrating an example sensing scenario in accordance with various aspects of the present disclosure. A base station may detect or estimate the distance of a UE with respect to the base station based on a Uu link (e.g., based on calculating the reference signal transmitted to the UE and/or received from the UE, etc.). Similarly, a first UE (e.g., a vehicle UE, a sidelink UE) may detect the distance of a second UE with respect to the first UE based on sidelink (e.g., based on calculating sidelink signals transmitted to the second UE and/or received from the second UE, etc.). A UE may also detect the distance of an object (e.g., a pedestrian) based on RF sensing, such as by transmitting RRS and receiving RRS bounced from the object.

In some scenarios, communication-centric waveforms (e.g., waveform primarily or initially designed for communication), such as OFDM waveforms, may suffer from certain drawbacks when they are applied for sensing applications. For example, during a monostatic sensing mode, the target delay spread in a long-range radar may be much higher than the communications due to two-way path and long-range radar sensing specifications. If cyclic prefix (CP) length of a transmitted signal is not smaller than the delay spread, it may cause intersymbol interference (ISI) and intercarrier interference (ICI) effects, such as described in connection with FIG. 9 below. The ISI and/or the ICI effects may degrade radar detection and estimation performance. On the other hand, increasing CP length to enable higher or more accurate radar detection/sensing specifications may lead to considerable reduction in communication data rate. In another example, during a bistatic sensing mode, reference signals based on communication-centric waveforms, such as PRS or DMRS, may provide limited sensing estimation accuracy (e.g., poor angular estimation accuracy due to reduced RF chains with high-speed analog-to-digital converters (ADCs)). In another example, communication-centric waveforms may not be used for cooperative sensing as described in connection with FIG. 6A or for managing interference. In addition, communication-centric waveforms may suffer from high peak-to-average power ratio (PAPR).

Aspects presented herein may improve JCR system by providing an RRS with guard interval (GI)-FMCW waveform (e.g., FMCW waveform with GI). Aspects presented herein may be compatible with communication-centric waveforms and thereby may apply to UEs or network entities with minimal changes if specified. Aspects presented herein may also provide signaling specification changes specified to support and configure the RRS design with guard interval-frequency modulated continuous wave (GI-FMCW) waveform for monostatic and bi-static sensing modes. A guard interval may be used between two distinct transmissions to ensure that the two distinct transmissions do not interfere with one another, or otherwise cause overlapping transmissions. These transmissions may belong to different users (as in TDMA) or to the same user (as in OFDM).

In one aspect of the present disclosure, the GI-FMCW waveform described herein may be used for different RF sensing applications, such as the monostatic sensing, the bistatic sensing, and/or multi-static sensing specifications. For example, the GI-FMCW waveform described herein may be used for monostatic sensing to improve the monostatic sensing performance and/or to provide waveform diversity. The GI-FMCW waveform described herein may also be compatible with certain existing radar waveforms (e.g., PRS) for multi-user interference management with other FMCW radars. For example, other FMCW radars may be using FMCW waveforms and a common FMCW mitigation technique, such as different frame offsets with same chirp slope, which may be specified or enforced among all the users to reduce interference. The GI-FMCW waveform described herein may also support simultaneous RF sensing and communication in a seamless way with low overhead at the physical layer.

In another example, the GI-FMCW waveform described herein may be used for bistatic sensing and multi-static sensing to improve bistatic sensing performance and/or to provide waveform diversity. The GI-FMCW waveform described herein may be used for a positioning application instead of a PRS signal, and/or for a channel/Doppler estimation instead of DMRS, or for supporting beam management instead of CSI-RS, etc. In another example, the GI-FMCW waveform described herein may enable a transmitting device to transmit the FMCW waveform "blindly" to serve as a "beacon" for other receiving devices in the area (if any). This may be applied for vulnerable UEs (e.g., vulnerable road users (VRUs)) that may be specified to be detected as far as possible and the FMCW detection might be suitable in that respect (instead of CP-OFDM detection).

For multi-static sensing or simultaneous monostatic and bistatic sensing, the GI-FMCW waveform described herein may support cooperative radar. For example, the multi-static sensing may use the same waveform, where other UEs supporting FMCW radar processing may rely on certain existing radar hardware. The GI-FMCW waveform may also be used for supporting joint communication positioning and monostatic radar sensing using a common waveform. This may provide in a more efficient spectrum usage and may also reduce interferences (e.g., ISI, ICI, etc.). For purpose of the present disclosure, a waveform that is used for communication and formulated based on OFDM may be referred to as an OFDM symbol or an OFDM communication symbol, and an OFDM symbol that includes a CP may be referred to as a CP-OFDM. Similarly, a waveform that is used for RF sensing and formulated based on FMCW may be referred to as an FMCW symbol or an FMCW sensing symbol, and an FMCW symbol that includes a GI may be referred to as a GI-FMCW.

Figure 9:
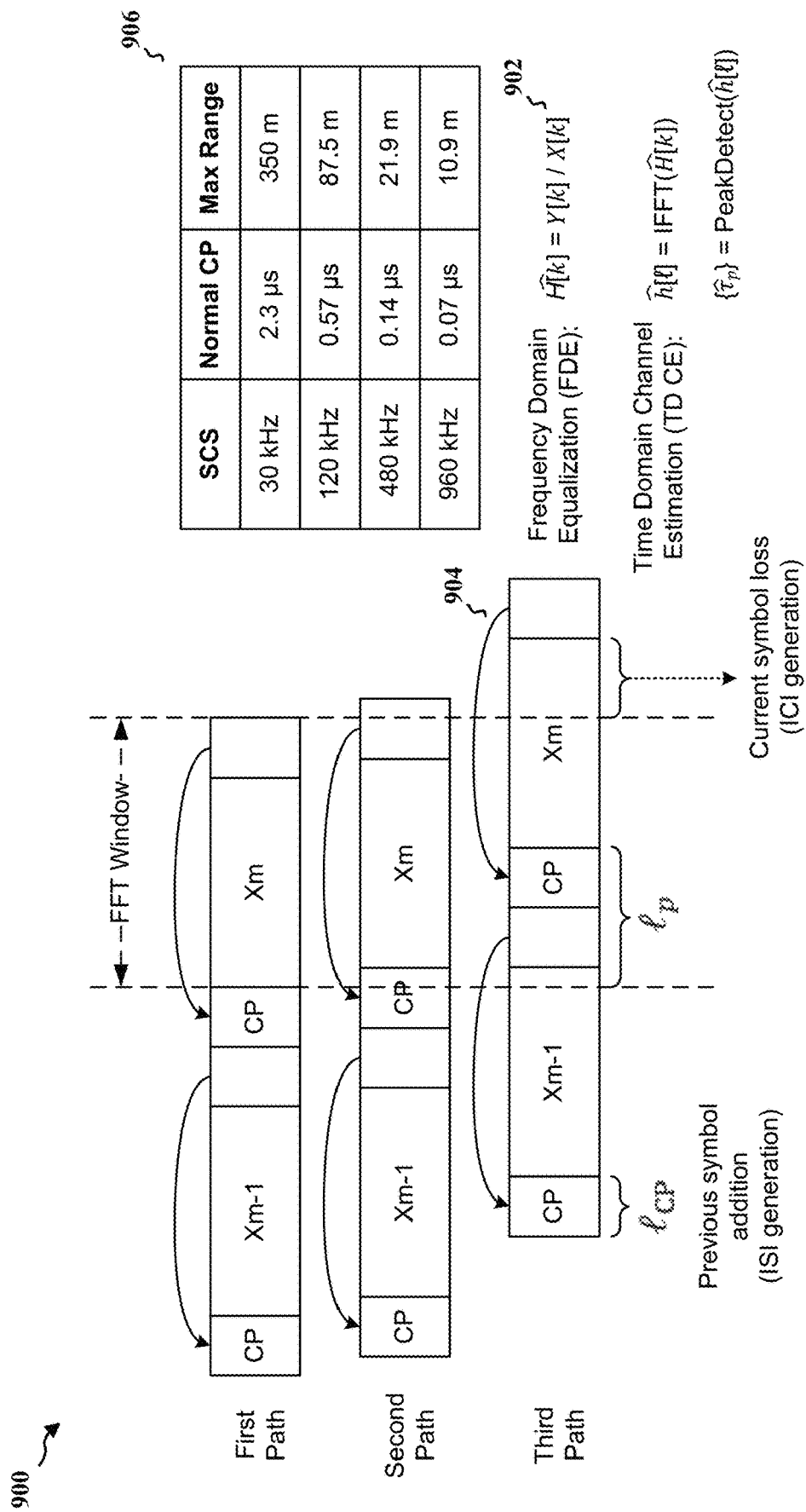
FIG. 9 is a diagram illustrating an example of cyclic prefix-orthogonal frequency division multiplexing (CP-OFDM) with large delay spreads in accordance with various aspects of the present disclosure.

FIG. 9 is a diagram 900 illustrating an example of CP-OFDM with large delay spreads in accordance with various aspects of the present disclosure. Delay spread may refer to a measure of the multipath profile of a mobile communications channel. In some examples, the delay spread may be defined as the difference between the time of arrival of the earliest component (e.g., the line-of-sight wave if there exists) and the time of arrival of the latest multipath component.

In one example, frequency domain equalization (FDE)-based method (e.g., enhancing transmission rate by reducing transmit redundancy in the form of CP) used in communication channel estimation may also be extended for estimating radar channel and delay profile. For example, as shown at 902, X[k] represents the transmit frequency domain symbol (which may be known for a radar as it has co-located Tx and Rx) and Y[k] represents the received frequency domain symbol. Then, the channel $\hat{H}[k]$ in the frequency domain may be obtained based on $\hat{H}[k]=Y[k]/X[k]$. After applying inverse Fast Fourier Transform (IFFT) to the channel $\hat{H}[k]$ in the frequency domain, the channel $\hat{h}[l]$ in the time domain may be obtained, and channel estimation (e.g., peaks $\{\hat{\tau}_p\}$) of the channel $\hat{h}[l]$ in the time domain may be calculated based on $\{\hat{\tau}_p\}$=PeakDetect($\hat{h}[l]$). Then, the delay profile or the delay spread associated with the multipath may be obtained. The FDE-based method may be of low-complexity and may not specify much change in communication Rx processing blocks.

As shown at 904, when the delay spread ($l_p$) is larger than the CP length ($l_{cp}$)), there may be a previous symbol addition and a current symbol loss. This may lead to additional correlated ISI/ICI noise and loss of radar target amplitude power, thereby reducing the radar estimation/detection accuracy and coverage (e.g., maximum detectable radar target range).

As shown at 906, when subcarrier spacing (SCS) increases, the CP length may decrease proportionally. In addition, normal CP length may lead to limited maximum range at higher SCS (which may be less than a suitable automotive radar maximum range) without any ISI and ICI effect.

In one aspect of the present disclosure, to achieve enhanced sensing performance using a communication-centric JCR hardware, an RRS design based on GI-FMCW may be used by the communication-centric JCR hardware for performing RF sensing.

Figure 10:
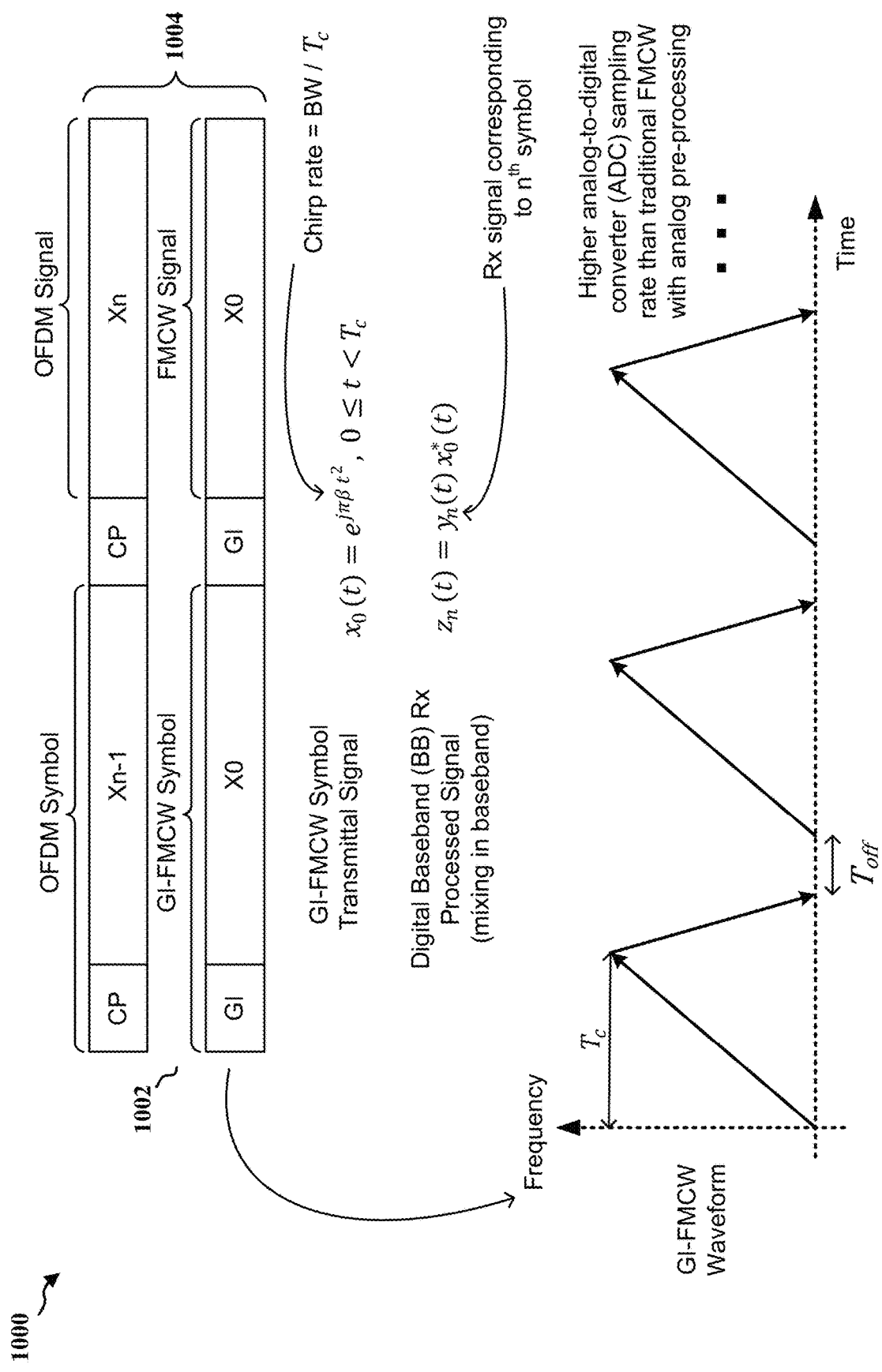
FIG. 10 is a diagram illustrating an example guard interval-frequency modulated continuous wave (GI-FMCW) waveform in accordance with various aspects of the present disclosure.

FIG. 10 is a diagram 1000 illustrating an example GI-FMCW waveform in accordance with various aspects of the present disclosure. As shown at 1002, a GI-FMCW waveform may include an FMCW chirp (e.g., with a duration $T_c$) and a GI. Instead of a CP, the GI-FMCW waveform may utilize or exploit zeros in its GI. In some FMCW waveforms, the GI may be denoted as "off-period" with the time interval $T_{off}$.

There may be multiple symbol structures for the GI-FMCW waveform. In one example, the length of a GI-FMCW symbol without GI may be the same as the length of an OFDM symbol without CP for a given SCS. As such, as shown at 1004, the GI length may be of the same duration as the CP length to maintain the same slot structure. In addition, the GI may be allocated at the start of a symbol or at the end of the symbol. In another example, the length of a GI-FMCW symbol may be the same as the OFDM symbol with CP. Here the length of GI is zero, where the GI length may be zero (0). In some example, the GI-FMCW described herein may also be phase coded to simultaneously support communication data.

Figure 11:
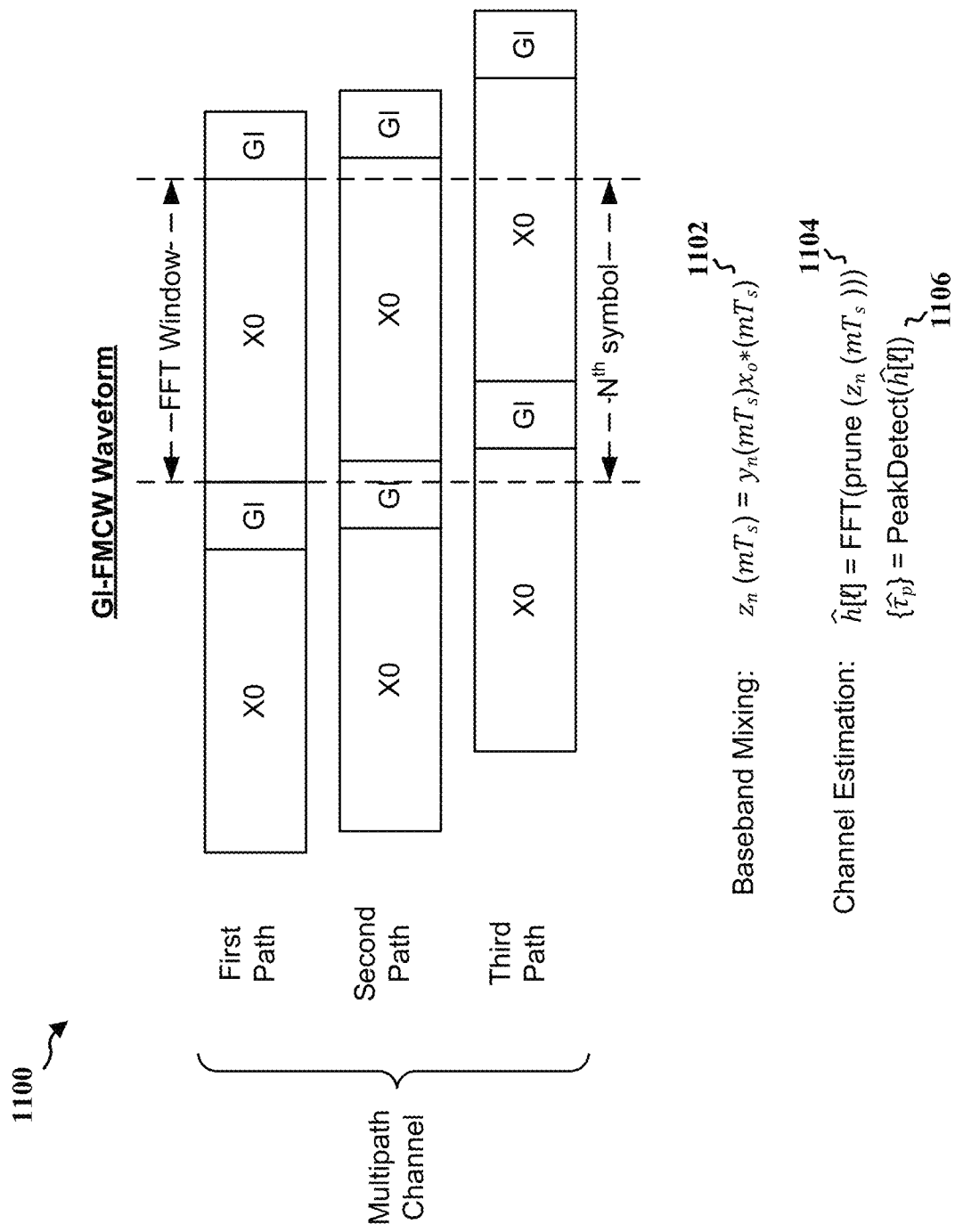
FIG. 11 is a diagram illustrating an example baseband processing of GI-FMCW waveform based radar reference signal (RRS) in accordance with various aspects of the present disclosure.
Figure 20:
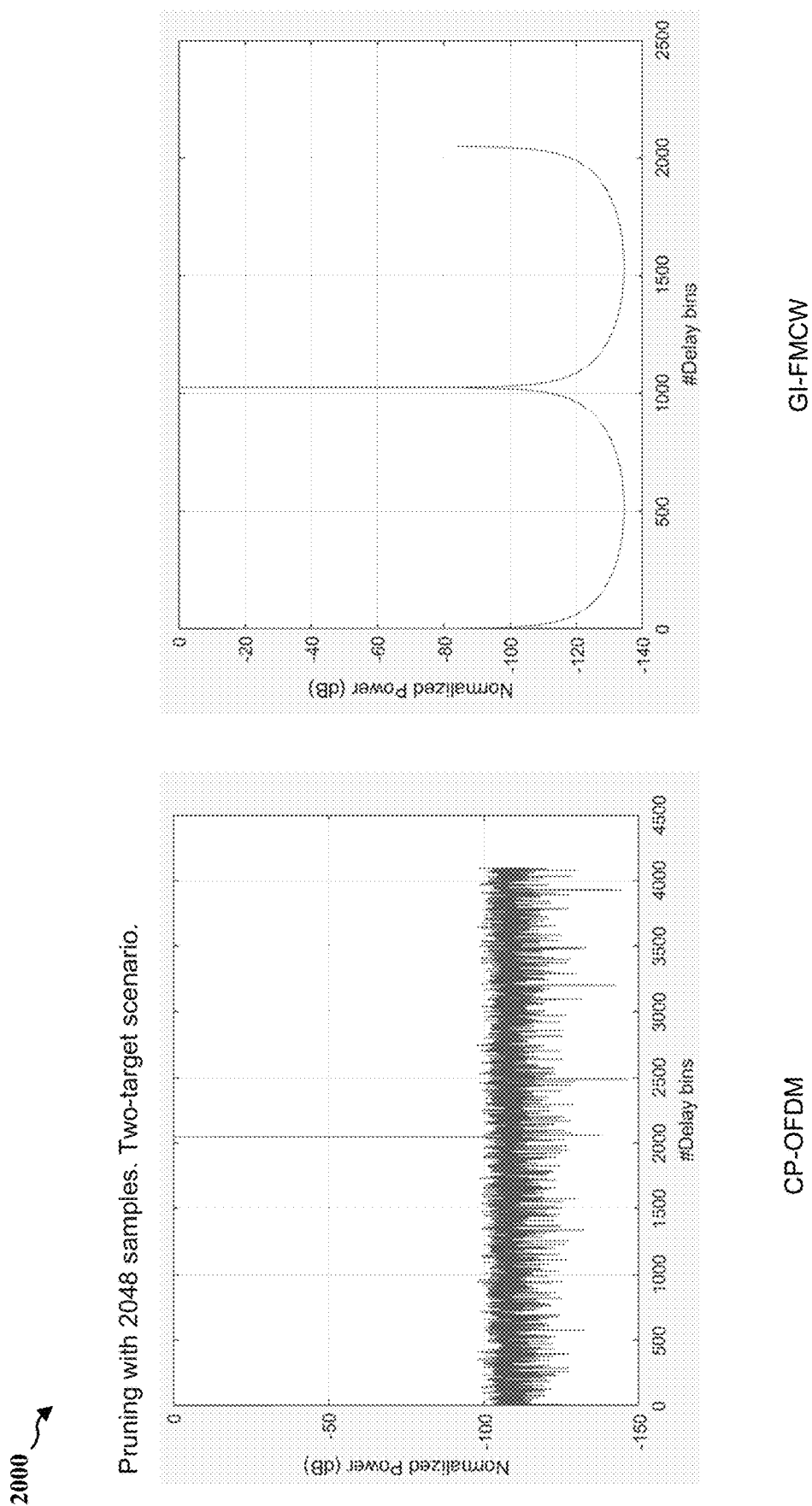
FIG. 20 is a diagram illustration an example comparison between GI-FMCW and CP-OFDM based on pruning with 2048 samples for a two-target scenario in accordance with various aspects of the present disclosure.

FIG. 11 is a diagram 1100 illustrating an example baseband processing of GI-FMCW waveform based RRS in accordance with various aspects of the present disclosure. In one aspect of the present disclosure, the Rx processing for GI-FMCW waveform may be performed using communication (e.g., NR) hardware with fully digital baseband (BB) processing that involves mixing, or the Rx processing may be performed using FMCW radar receiver where the mixing may be done in the analog domain. A comparison between the two is illustrated by FIG. 20.

In one example, the baseband processing of GI-FMCW using a communication hardware, such as an NR receiver, may include following steps. First, as shown at 1102, a device may apply a digital mixing of the received signal and the transmit signal based on $z_n(mT_s)=y_n(mT_s)x_o^*(mT_s)$, where $T_s$ is the sampling interval, m is the sample index, $x_o^*$ represents the transmit signal, $y_n$ represents the received signal, and $z_n(mT_s)$ represents the mixed baseband signal. The process of mixing the signals to the baseband for processing may be referred to as "baseband mixing. The baseband mixing may be performed in a digital domain for a given FFT window corresponding to $n^{th}$ symbol, which may be the same or identical to the OFDM radar processing.

At 1104, the device may prune the mixed incoming signal $z_n(mT_s)$ to reduce ICI and ISI effect to obtain a pruned signal $\hat{h}[l]$, such as in a near-far case where a near target's sidelobe may cause reduced performance for a far target. Then, the device may apply Fast Fourier Transform (FFT) to the pruned signal in the time domain, unlike OFDM-radar which may apply IFFT in the frequency domain.

At 1106, the device may detect the peaks of the pruned signal $\hat{h}[l]$ in the frequency domain to obtain the channel estimation in the frequency domain.

Figure 12:
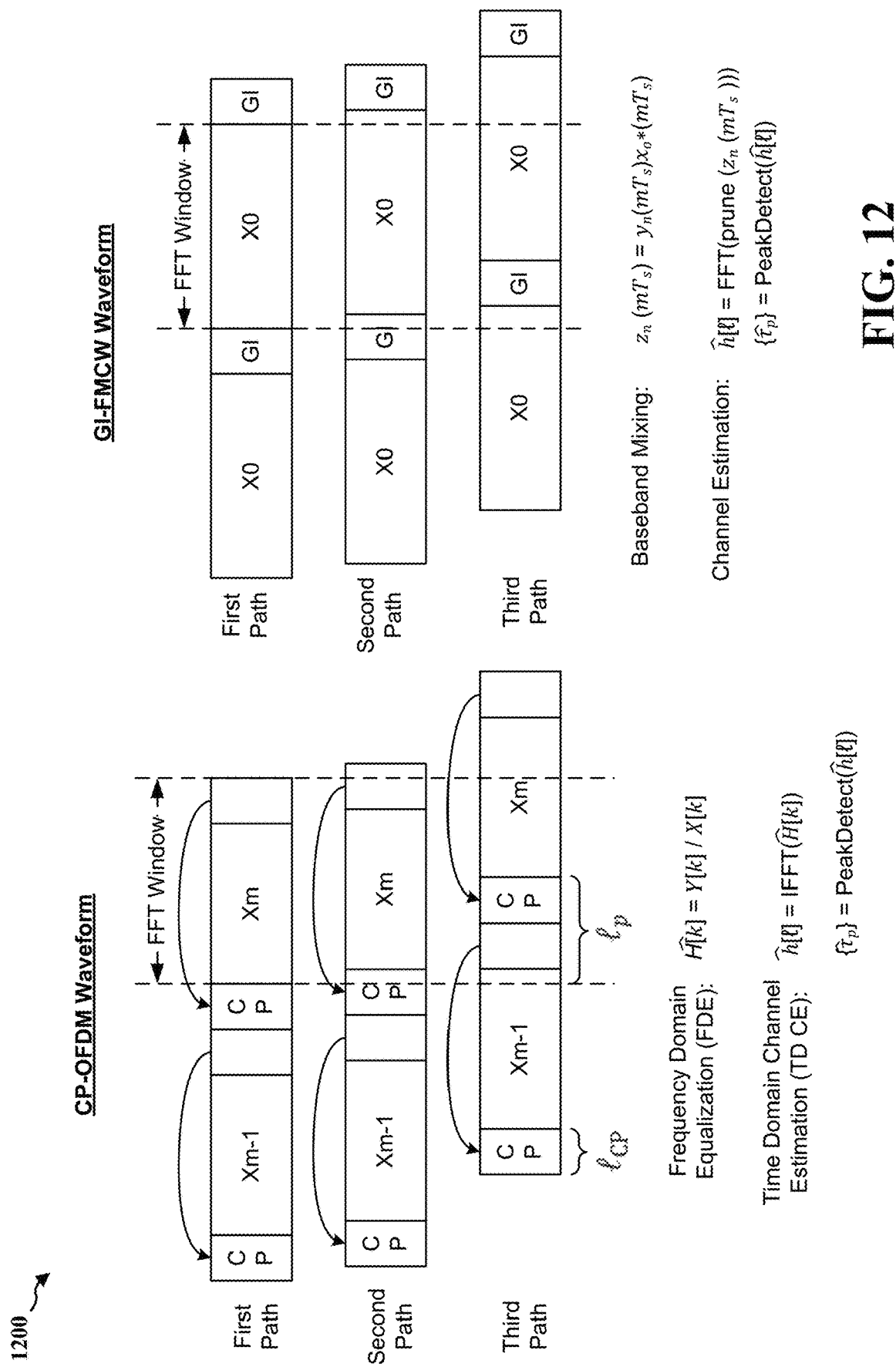
FIG. 12 is a diagram illustrating an example comparison between CP-OFDM radar and GI-OFDM radar that are associated with a two-tap delay and digital Rx processing in accordance with various aspects of the present disclosure.

FIG. 12 is a diagram 1200 illustrating an example comparison between CP-OFDM radar and GI-OFDM radar that are associated with a two-tap delay and digital Rx processing in accordance with various aspects of the present disclosure. A tap may refer to a coefficient value and the impulse response of a filter may refer to the filter's coefficients. For example, under digital signal processing (DSP), a tap may be used for defining impulse response of systems, such as for a finite impulse response (FIR) filter.

Based on the baseband mixing described in connection with FIGS. 11 and 12, the beat frequency between a transmit signal and a received signal may be calculated. A beat frequency may refer to the difference in frequency of two waves (e.g., the absolute value of the difference in frequency of the two waves). For example, referring back to FIG. 10, the FMCW chirp may be represented by $x(t)=e^{j\pi\beta t^2}$, where $0 \le t < T_c$ and the chirp rate may be calculated based on bandwidth (BW) over $T_c$ (e.g., $BW/T_c$). The Tx signal corresponding to an $n^{th}$ symbol may be represented by $x_n(t)=x(t-nT_c)$, where $n=0, 1, \ldots, N_c-1$. If there is no Doppler, the Rx signal corresponding to the $n^{th}$ symbol may be represented by $y_n(t)=\alpha_{rx}x_n(t-t_d(t))$ where $t_d$ is the delay that equals $2R/c$ (R is the range and c is speed of light). The output of the signal that goes through the digital baseband mixing may be represented by $z_n(t)=y_n(t)x^*(t)=\alpha_{rx}x(t-t_d)x^*(t)=\alpha_{rx}e^{-j2\pi\beta t_d t}e^{j\pi\beta t_d^2}=\beta_{rx}e^{-j2\pi\beta 2R/ct}$ for $z_n(t)$ $(0 \le t < T_{up}$ and 0≤n<$N_c$). The range R may be estimated using FFT-based processing in the time domain.

FIG. 13 is a diagram 1300 illustration an example comparison between GI-FMCW and CP-OFDM for same length of GI and CP (e.g., GI duration=CP duration) in accordance with various aspects of the present disclosure.

Figure 14:
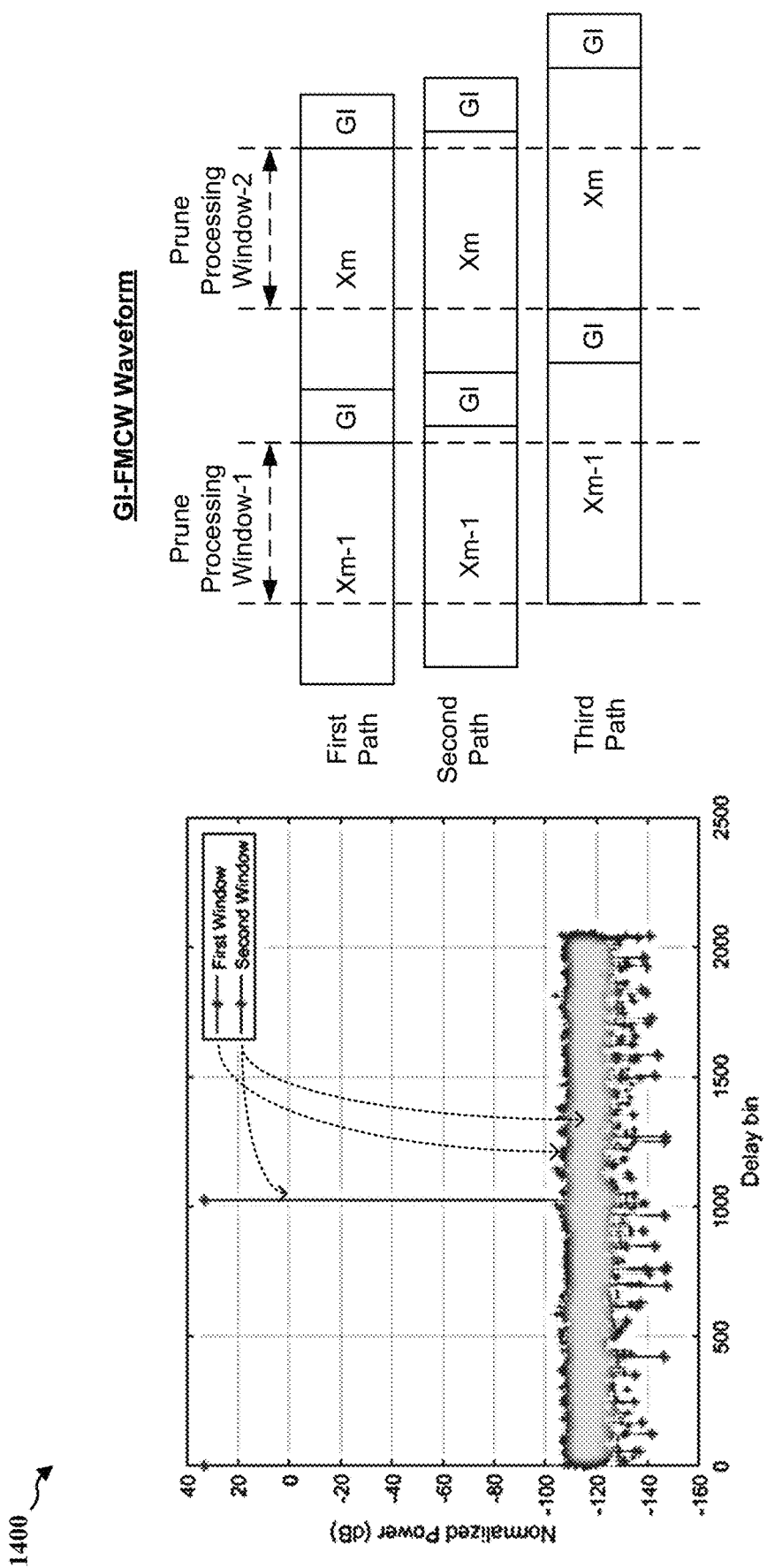
FIG. 14 is a diagram illustration an example FMCW processing with pruning in accordance with various aspects of the present disclosure.

FIG. 14 is a diagram 1400 illustration an example FMCW processing with pruning in accordance with various aspects of the present disclosure. The FMCW processing in this example is associated with a two-target scenario with the far-target placed at 300 meters, and the Pruned processing has a length of 2048 delay bins.

Figure 15:
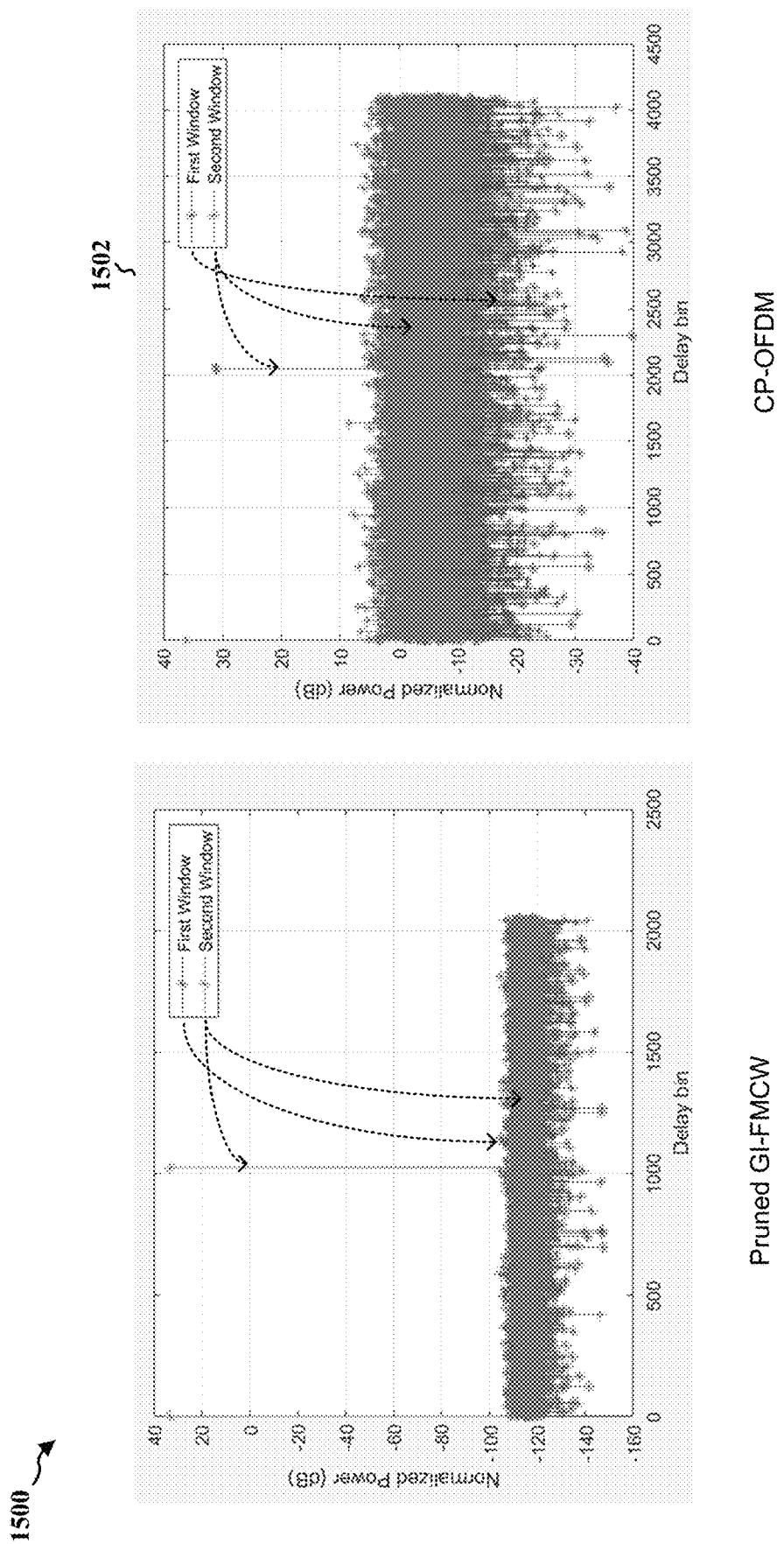
FIG. 15 is a diagram illustration an example comparison between CP-OFDM and GI-FMCW in accordance with various aspects of the present disclosure.

FIG. 15 is a diagram 1500 illustration an example comparison between CP-OFDM and GI-FMCW in accordance with various aspects of the present disclosure. The FMCW processing in this example is associated with a two-target scenario with the far-target placed at 300 meters. As shown at 1502, CP-OFDM may suffer from reduced signal to interference plus noise ratio (SINR) for the far target due to increased ICI and ISI as compared to the GI-OFDM.

FIG. 16 is a diagram 1600 illustration an example comparison between GI-FMCW without GI (e.g., GI duration=0) and CP-OFDM in accordance with various aspects of the present disclosure.

Figure 17:
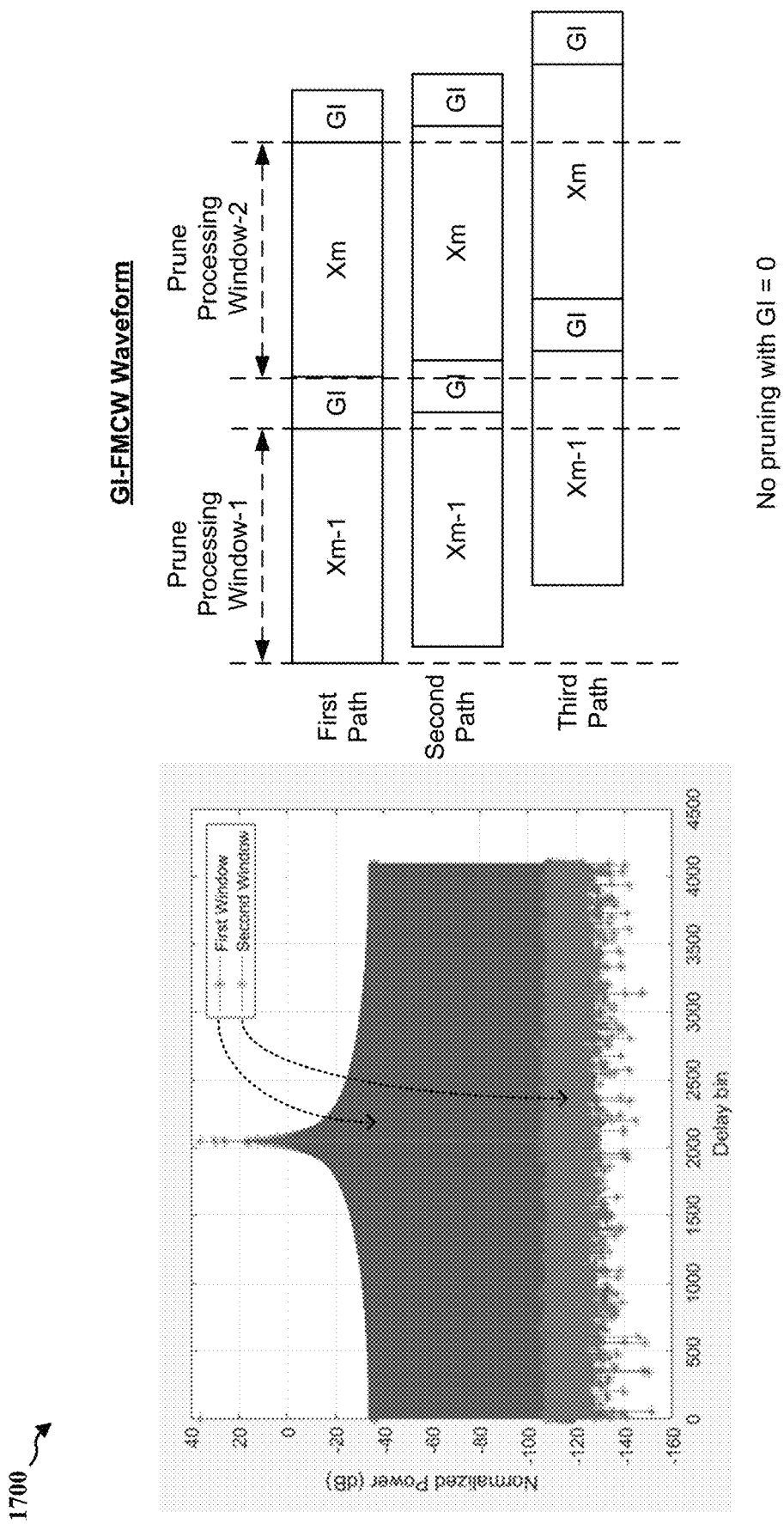
FIG. 17 is a diagram illustration an example FMCW processing without pruning and GI in accordance with various aspects of the present disclosure.

FIG. 17 is a diagram 1700 illustration an example FMCW processing without pruning and GI (e.g., GI duration=0) in accordance with various aspects of the present disclosure.

Figure 18:
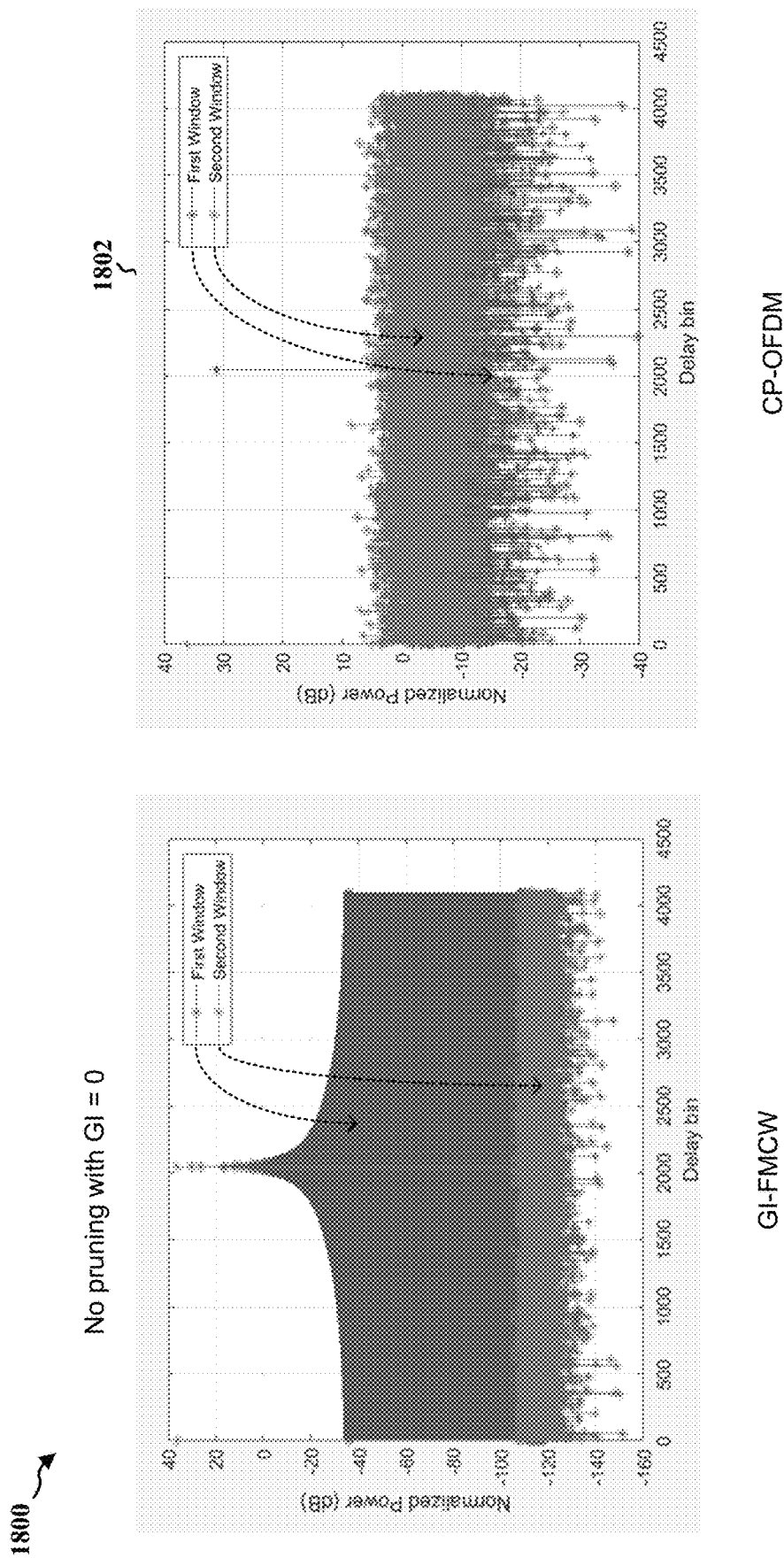
FIG. 18 is a diagram illustration an example comparison between CP-OFDM and GI-FMCW without pruning and GI in accordance with various aspects of the present disclosure.

FIG. 18 is a diagram 1800 illustration an example comparison between CP-OFDM and GI-FMCW without pruning and GI (e.g., GI duration=0) in accordance with various aspects of the present disclosure. As shown at 1802, CP-OFDM may suffer from increased ICI and ISI as compared to GI-OFDM, such as in the second processing window.

FIG. 19 is a diagram 1900 illustration an example comparison between GI-FMCW and CP-OFDM in accordance with various aspects of the present disclosure. When pruning is not applied for the FMCW processing, there may be same net leakage energy but with different leakage shapes.

FIG. 20 is a diagram 2000 illustration an example comparison between GI-FMCW and CP-OFDM based on pruning with 2048 samples for a two-target scenario in accordance with various aspects of the present disclosure. When pruning is applied for the FMCW processing, there may be a reduced net leakage energy in GI-FMCW due to pruning, and also with different leakage shapes.

FIG. 21 is a diagram 2100 illustrating an example comparison between FMCW waveform and the GI-FMCW waveform described herein from a transmission perspective in accordance with various aspects of the present disclosure.

FIG. 22 is a diagram 2200 illustrating an example comparison between analog and baseband FMCW Rx processing in accordance with various aspects of the present disclosure.

Figure 23:
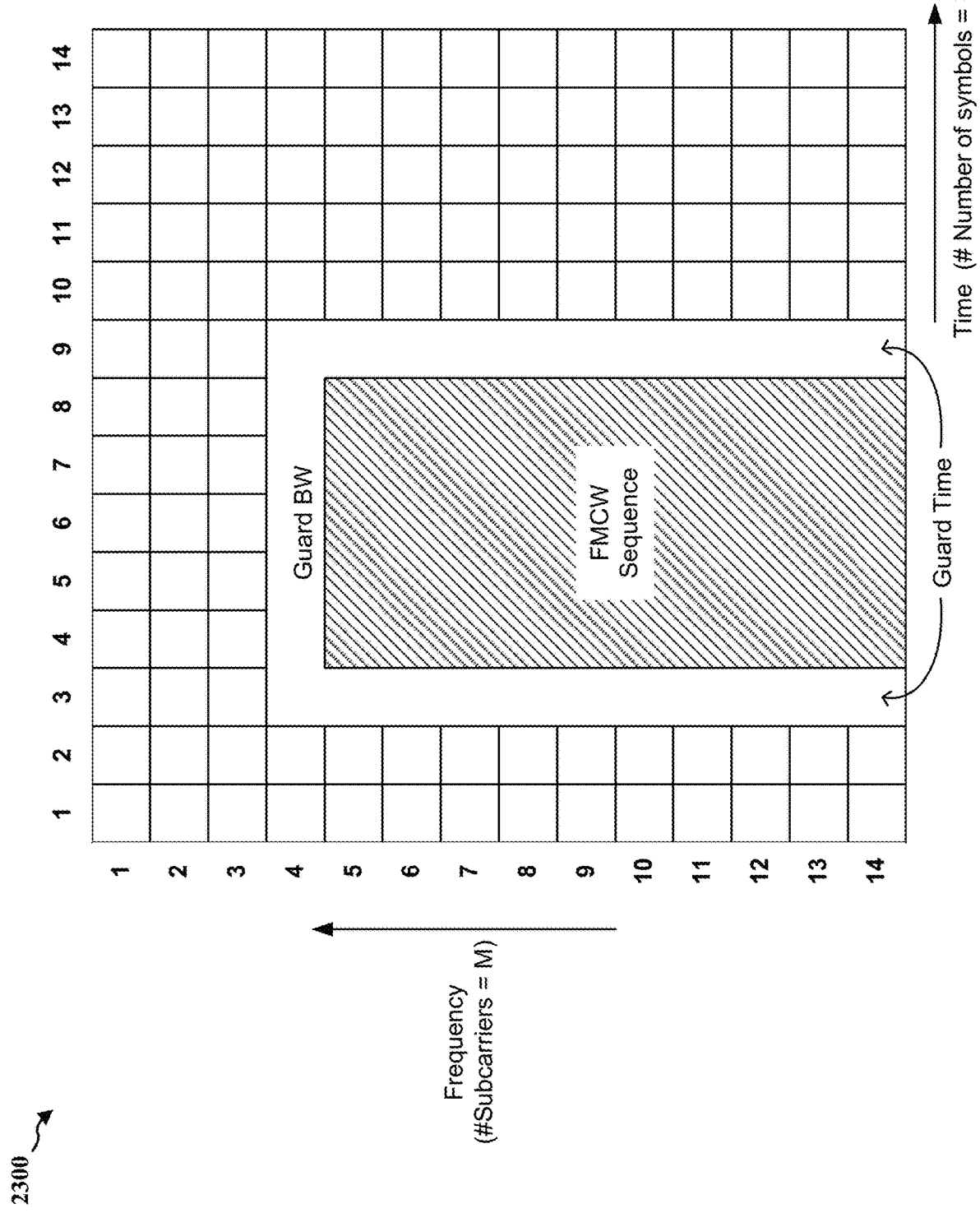
FIG. 23 is a diagram illustrating an example resource allocation of the GI-FMCW reference signal (RS) design in accordance with various aspects of the present disclosure.

FIG. 23 is a diagram 2300 illustrating an example resource allocation of the GI-FMCW RS design in accordance with various aspects of the present disclosure. In one aspect, a GI-FMCW RS burst (e.g., burst=a few continuous symbols) may be multiplexed with CP-OFDM (or DFT-s-OFDM) waveform in the following ways. Under time-division multiplexing (TDM), different symbols and/or slots may be used for GI-FMCW and CP-OFDM with the same numerology. Under frequency-division multiplexing (FDM), different frequency bands (e.g., subcarriers) may be used for GI-FMCW and CP-OFDM with the same numerology. Under spatial-division multiplexing (SDM), different beams may be used for GI-FMCW and CP-OFDM with the same or different numerology. In some examples, additional guard bandwidth may be provided in the time-frequency domain to reduce the interference between the RF sensing mode and the communication mode. In addition, the GI-FMCW RS burst may be repeated with certain intervals to enable velocity estimation and periodic sensing with a given update rate.

Aspects presented herein may enable a device (e.g., a UE, an RF node, a network node, etc.) to transmit a set of symbols that includes a subset of communication data symbols (e.g., CP-OFDM symbols) and a subset of sensing symbols (e.g., GI-FMCW symbols), where one or more configuration parameters of sensing symbols (e.g., GI-FMCW waveform or GI-FMCW waveform codebook) may be dependent on the parameters of communication data symbols. For example, the slope, symbol length, and/or GI duration of the GI-FMCW symbols may be dependent on the CP-OFDM symbol configuration. In another example, the GI duration of a GI-FMCW symbol may either equal to the CP length of the CP-OFDM symbol or be assigned with a zero value, and the symbol duration of GI-FMCW may be kept the same as the CP-OFDM symbol. The slope of GI-FMCW chirp may equal to the ratio of its allocated bandwidth resource minus guard bands to its symbol duration. As such, both the allocated bandwidth resource and guard bands may be integer multiples of CP-OFDM's subcarrier spacings.

Figure 24:
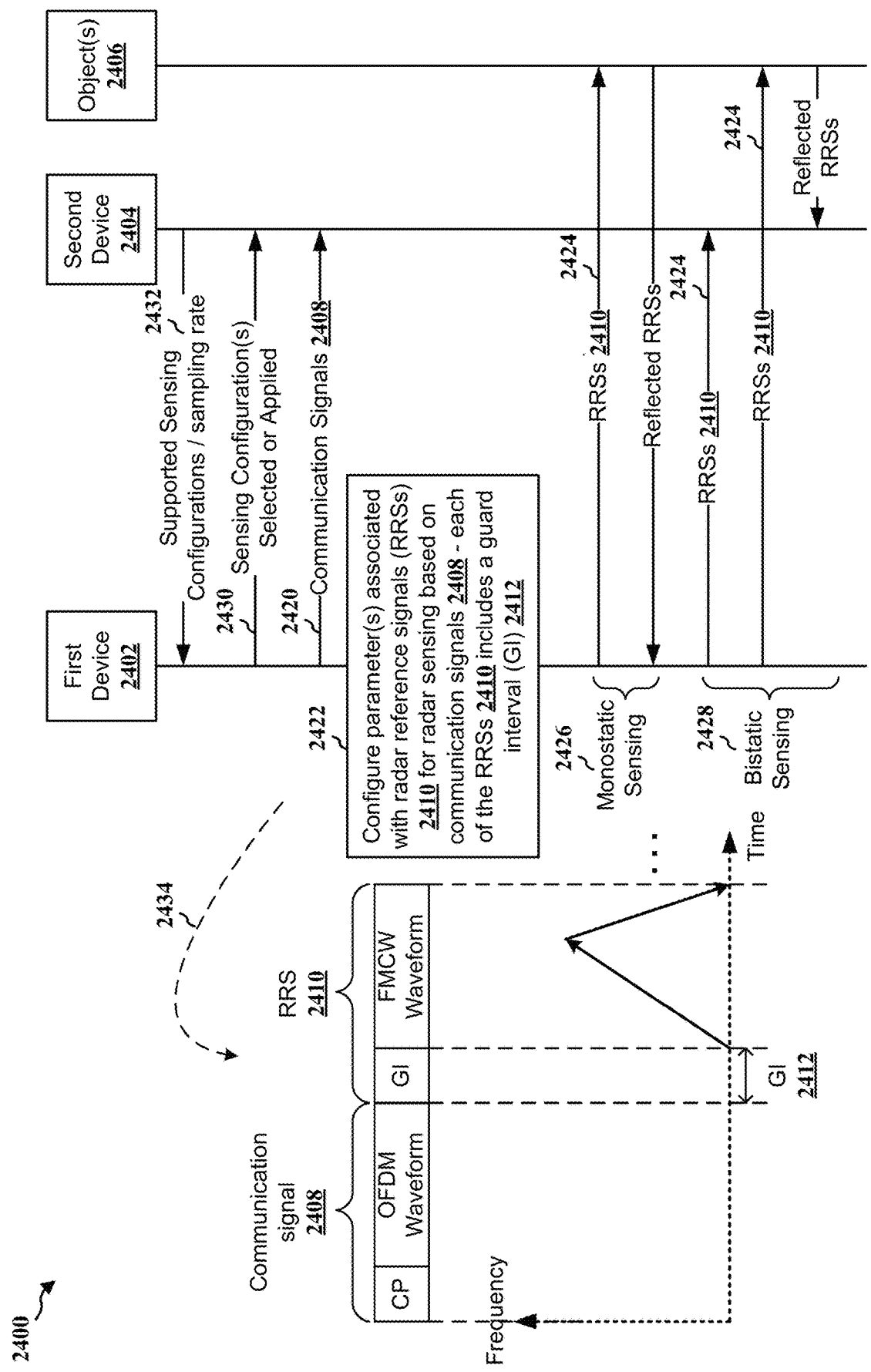
FIG. 24 is a communication flow illustrating an example of configuring and transmitting GI-FMCW in accordance with various aspects of the present disclosure.

FIG. 24 is a communication flow 2400 illustrating an example of configuring and transmitting GI-FMCW in accordance with various aspects of the present disclosure. The numberings associated with the communication flow 2400 do not specify a particular temporal order and are merely used as references for the communication flow 2400.

At 2420, a first device 2402 (e.g., a Tx UE, an RF sensing node, a network node, a base station, a component of the base station, etc.) may transmit communication signals 2408 to a second device 2404 (e.g., an Rx UE, an RF sensing node, a network node, a base station, a component of the base station, etc.), where the communication signals 2408 may be generated based on communication waveforms, such as based on OFDM waveforms. In one example, that the second device 2404 may be a device that is receiving communications from the first device 2402 and is not associated with any RF sensing. In another example, the second device 2404 may be an Rx device participating in a bistatic RF sensing with the first device 2402, such that the second device 2404 may monitor and receive radar signals transmitted from the first device 2402 (discussed below). In another example, the second device 2404 may receive both communication signals and radar signals (e.g., RRSs) from the first device 2402.

At 2422, the first device 2402 may configure one or more parameters associated with RRSs 2410 for RF sensing (or radar sensing) based on the communication signals 2408. As shown at 2434, each of the RRSs 2410 may include a GI 2412, such as described in connection with FIGS. 10 to 12. The RRSs 2410 may include FMCW symbols/waveforms, and the GI 2412 may be allocated at the start of an RRS or at the end of an RRS in the RRSs 2410.

In one example, the one or more parameters may include a slope associated with the RRSs 2410. For example, the slope for the RRSs 2410 may be calculated based on a ratio associated with the symbol length of a first RRS in the RRSs 2410 and a first bandwidth allocated for the first RRS minus a second bandwidth allocated for the GI 2412 of the first RRS. Thus, the first bandwidth and the second bandwidth may be integer multiples of an SCS configured for the communication signals 2408. In another example, the one or more parameters may include a symbol length for each RRS in the RRSs 2410. In another example, the one or more parameters may include a duration for the GI 2412 of the RRSs 2410. In such an example, the duration for the GI 2412 may equal to the CP length of the communication signal 2408 (e.g., the CP length of a CP-OFDM symbol), or the duration for the GI 2412 may be assigned with a zero value. The symbol duration of RRSs 2410 may be kept the same as the communication signal 2408. In another example, the duration for the GI 2412 may be an integer multiple of a sampling interval associated with the communication signals 2408. In such an example, the maximum duration of the GI 2412 may be based on a symbol duration associated with the communication signals 2408 and a maximum radar range specification.

At 2424, the first device 2402 may transmit the set of RRSs 2410 associated with the one or more parameters. Note while the communication flow 2400 shows the first device 2402 transmits communication signals 2408 prior to the RRSs 2410, it is merely for illustrative purposes. As the first device 2402 may transmit a set of symbols that include both CP-OFDM symbols (for communication) and GI-FMCW symbols (for RF sensing), the first device 2402 may interleave the CP-OFDM symbols with the GI-FMCW symbols (e.g., GI-FMCW symbols are transmitted at symbols #1, 3, and 5, whereas CP-OFDM symbols are transmitted at symbols #2, 4, and 6, etc.).

Depending on whether the radar sensing is based on monostatic sensing or bistatic/multi-static sensing, the first device 2402 may be configured to receive the RRSs reflected from one or more objects, such as described in connection with FIGS. 7A and 7B. For example, as shown at 2426, if the first device 2402 is configured to perform monostatic sensing, after the first device 2402 transmits the RRSs 2410, the first device 2402 may monitor for the RRSs reflected from one or more objects 2406. Then, based on the time different between the transmission of the RRSs 2410 and the reception of the reflected RRSs, the first device 2402 may determine the speed, the distance, and/or the direction of the one or more objects 2406 with respect to the first device 2402. In one example, the first device 2402 may transmit information indicative of at least one configuration for the RRS 2410 to another device, such as the second device 2404, such that the another device may know the waveform of the RRS 2410 transmitted from the first device 2402, and the another device may configure its transmission or reception of RF sensing signals and/or communication signals to avoid or manage interference. Similarly, the first device 2402 may also receive information indicative of at least one configuration for a second set of RRSs from another device (e.g., sensing signals from another device), such as the second device 2404, and then the first device 2402 may transmit the RRSs 2410 based on this information to avoid or manage interference. The information may be exchanged between devices, such as between the first device 2402 and the second device 2404, via DCI, UCI, SCI, and/or a MAC-CE. As such, the information may be exchanged in a joint fashion or without a centralized controller (e.g., without going through a network node, such as a base station or a component of the base station).

In one aspect of the present disclosure, as shown at 2430, under the monostatic sensing, the first device 2402 may inform other devices, such as the second device 2404, regarding its GI-FMCW configuration(s)/parameter(s), such as occupied slots and/or time-frequency pattern (e.g., repetition interval), GI duration, equivalent SCS, frame offset, BW, chirp slope, and/or beamforming parameters (e.g., beamwidth, beam shape, beam pointing direction, antenna architecture information—such as no support for virtual MIMO), etc. In some examples, the GI-FMCW configuration(s)/parameter(s), such as the symbol duration without GI, GI duration, slope, and/or beam direction, etc., may be restricted to a (finite) set of options ("configurations") available in a pre-configured look-up table ("codebook"). This may aid an Rx device (e.g., the second device 2404, an Rx UE, etc.) to indicate which of the configuration(s)/parameter(s) the Rx device is capable of supporting (or requests) with a small overhead (e.g., by indicating the capability or request via a bitmap), such as shown at 2432. Additionally, the restricted configurations may enable the second device 2404 to be compatible with seamless integration with other waveforms at the physical layer (e.g., waveforms associated with NR), such as described in connection with FIGS. 9, 10, and 22. Similarly, the first device 2402 may be specified to indicate the configuration(s)/parameter(s) it is going to use for the GI-FMCW (e.g., out of the configuration(s)/parameter(s) indicated by the Rx device) to the second device 2404 or other Rx devices, such as at 2430. As such, devices that receive this information may differentiate their own radar signals accordingly for multiplexing monostatic sensing between different users to manage or avoid interferences. The exchanging of GI-FMCW configuration(s)/parameter(s) between devices (e.g., between the first device 2402 and the second device 2404 at 2430 and 2432) may also be performed in a joint fashion with or without a centralized controller (e.g., without going through a network node such as a base station or a component of the base station).

On the other hand, as shown at 2428, if the first device 2402 is configured to perform bistatic sensing or multi-static sensing, after the first device 2402 transmits the RRSs 2410, the second device 2404 (or a third device) may receive the RRSs 2410 and also monitor for the RRSs reflected from the one or more objects 2406. Then, based on the reception of the RRSs 2410 (from the first device 2402) and the reception of the reflected RRSs (from the one or more objects 2406), the speed, the distance, and/or the direction of the one or more objects 2406 with respect to the first device 2402 and/or the second device 2404 may be calculated. In one example, at 2432, the first device 2402 may receive information indicative of a sampling rate from the second device 2404, where the sampling rate may be associated with analog-to-digital converters (ADCs) of the second device 2404 for processing the RRSs 2410. Then, the first device 2402 may transmit the RRSs 2410 with at least one parameter/configuration configured based on the sampling rate provided by the second device 2404. In some implementations, the first device 2402 may also transmit the at least one parameter/configuration to the second device 2404 prior to transmitting the RRSs 2410. Similarly, the information may be transmitted or received via DCI, UCI, SCI, and/or a MAC-CE, and the information may be exchanged between the first device 2402 and the second device 2404 in a joint fashion with or without a centralized controller (e.g., without going through a network node or a base station).

In another aspect of the present disclosure, under the bistatic and multi-static sensing, an Rx device, such as the second device 2404, may inform the first device 2402 whether the second device 2404 has low sampling rate ADCs with analog mixing for FMCW processing, such as at 2432. In response, the first device 2402 may use this information to determine whether to transmit GI-FMCW radar waveform (e.g., the RRSs 2410) and/or one or more parameters associated with the GI-FMCW radar waveform. For example, MIMO Rx processing in angular domain with multiple RF chains may be possible with analog FMCW processing, which may lead to a lower net duration of GI-FMCW and enhanced angular estimation accuracy. In another example, the second device 2404 may also inform its supported GI-FMCW configurations (e.g., for use cases, such as low interference) or specification for virtual TDM-MIMO support.

After receiving the information from the second device 2404 regarding the GI-FMCW configuration(s)/parameter(s) supported by the second device 2404 (e.g., at 2432), at 2430, the first device 2402 may inform the second device 2404 one or more chosen GI-FMCW configuration(s)/parameter(s), such as occupied slots and/or time-frequency pattern (e.g., repetition interval), GI duration, equivalent SCS, frame offset, BW, chirp slope, and/or beamforming parameters (e.g., beamwidth, beam shape, beam pointing direction, antenna architecture information—such as no support for virtual MIMO), etc. Similarly, the GI-FMCW configuration(s)/parameter(s) (such, as symbol duration without GI, GI duration, slope, beam direction, etc.) may be restricted to a (finite) set of options ("configurations") available in a pre-configured look-up table ("codebook").

In some scenarios, if the second device 2404 (e.g., an Rx device) is widely separated from the first device 2402 (e.g., the distance between the first device 2402 and the second device 2404 exceeds a distance threshold) and the second device 2404 does not have low sampling rate ADCs with analog mixing for FMCW processing, the first device 2402 may still choose a GI-FMCW waveform with low PAPR for enhancing the sensing performance or for enhancing the waveform diversity with BB Rx processing to enable Rx hardware reuse.

In another aspect of the present disclosure, the first device may apply phase coding to the RRSs 2410 (e.g., the GI-FMCW waveform) to enable simultaneous communication operation, where the maximum rate of the phase coding may depend on the SCS and FFT size of an equivalent CP-OFDM configuration, such as the configuration for the communication signals 2408. Phase coding may refer to a process of reducing radio frequency interference (RFI) between adjacent radars, where phase coded waveforms may divide the pulse into N time segments, referred to as chips, and apply a different phase to each (e.g., binary phase codes may limit the chip phase to 0 or π, while polyphase codes support more levels). For example, when the first device 2402 or a sensing receiver is operating under the monostatic sensing mode (e.g., a monostatic sensing receiver), the first device 2402 or the sensing receiver may first apply phase code correction and then apply FMCW Rx processing as discussed in connection with FIG. 10. On the other hand, a communication receiver, such as the second device 2404, may extract the phase coded data with the prior knowledge that the waveform is GI-FMCW. In this case, communication devices that are without RF sensing specifications may be informed of GI-FMCW parameters of the first device 2402 to enable data decoding. In some examples, phase coded FMCW may also be used as a signature of a given Tx device, such as for the first device 2402. In this case, a relevant or corresponding Rx device may determine a relevant signature either through a network node (e.g., via a base station) or through a previous phase coded FMCW transmission from the Tx device.

In another example, the first device 2402 may inform its virtual antenna ports configuration (e.g., spatial quasi-co-located (QCL) information) to a receiving device, such as the second device 2404, to support time division multiplexing-multi-input multi-output (TDM-MIMO) based GI-FMCW sensing. In some scenarios, due to the use of high-speed ADCs, the communication hardware of a device (e.g., the first device 2402 and/or the second device 2404) may not be able to support fully-digital MIMO. However, the device may still be able to support TDM-MIMO based GI-FMCW sensing by keeping a few of the antennas activated or on at a given time. The time sequence of antenna selection or activation may depend on an angular resolution and latency specified for the RF sensing. The time sequence of antenna selection or activation may also depend on the constraints of the communication antenna hardware. In other scenarios, the first device 2402 may inform Rx devices (e.g., the second device 2404, Rx UEs, etc.) whether the first device 2402 supports TDM-MIMO based GI-FMCW sensing mode for its monostatic sensing or bistatic sensing. For example, if the first device 2402 supports TDM-MIMO based GI-FMCW sensing mode, the first device 2402 may inform other devices, such as the second device 2404, the sequence of virtual antenna selection/activation ports to support coherent communication and coherent multi-static MIMO sensing processing.

In another example, the first device 2402 may transmit the RRS 2410 based on a beacon configuration for reception by one or more beacon receivers. In such an example, the beacon configuration may include a signal pattern associated with a vulnerable road user (VRU). In some examples, a VRU may refer to a person or an entity that is at greatest risk for serious injury or death when they are involved in a motor-vehicle-related collision. For example, a VRU may include a pedestrian, a person operating a bicycle, motorcycle, scooter, or moped on the roadway, a person riding an animal, and/or a person operating on a public right-of-way, etc. The first device 2402 may transmit GI-FMCW waveform "blindly" to serve as a "beacon" (may be referred to as "GI-FMCW beacon" hereafter) for other Rx devices in an area (if any), where the GI-FMCW beacon may be associated with an VRU signal pattern to indicate other devices that the first device 2402 is a VRU. The GI-FMCW beacon may be configured to follow a pre-configured (e.g., a global) configuration so that an Rx device, such as the second device 2404, that detects the GI-FMCW beacon (or the associated FMCW configurations) may determine that the GI-FMCW beacon corresponds to a VRU signal or that the first device 2402 is a VRU. Then, the Rx device may try to initiate a communication link with the first device 2402, e.g., by pointing a narrow beam towards the detected direction. In some examples, configurations such as when the FMCW signal is transmitted within a slot and/or how many symbols are occupied within a slot may be pre-configured. Similarly, the FMCW transmission from the first device 2402 may serve as a "signature" for the presence of a VRU (e.g., the first device 2402). In some examples, the first device 2402 may be specified to indicate that it is interleaving OFDM with FMCW symbols if transmissions from the first device 2402 includes both communication and RF sensing signals (e.g., include both communication signals 2408 and RRSs 2410). As such, a receiving device, such as the second device 2404, may determine which symbols to consider for reception of communication signals 2408 and/or for the RRSs 2410. In one example, if the FMCW transmission pattern is known by an Rx device, such as the second device 2404, the first device 2402 may indicate to the Rx device whether it is a VRU or whether it is transmitting GI-FMCW beacon, such as by setting a dedicated control bit to true for that purpose.

Figure 25:
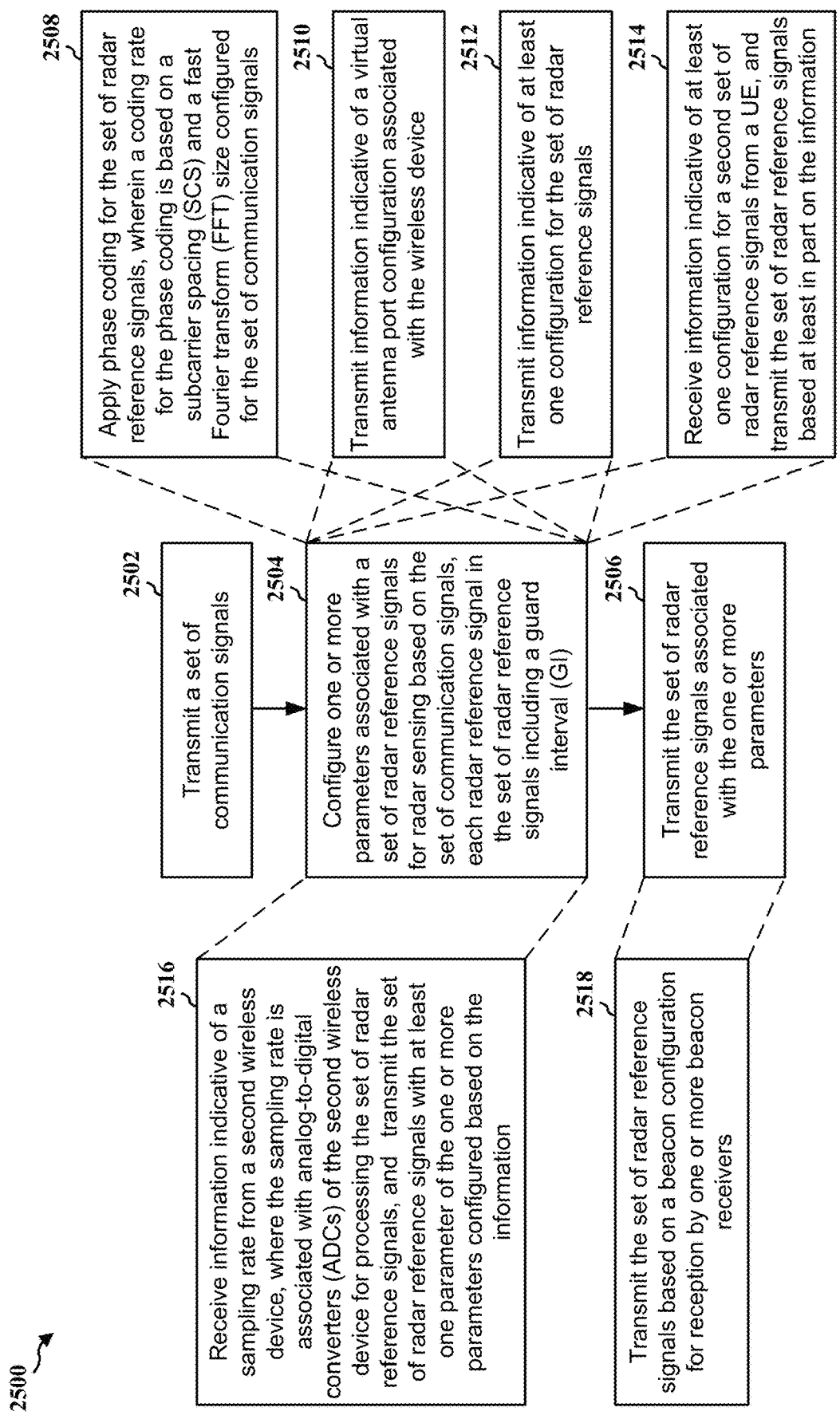
FIG. 25 is a flowchart of a method of wireless communication.

FIG. 25 is a flowchart 2500 of a method of wireless communication. The method may be performed by a wireless device (e.g., the UE 104; the base station 102; the first device 2402; the apparatus 2704; the network entity 2702). The method may enable the wireless device to configure and transmit GI-FMCW waveform for RF sensing of a joint communication-radar.

At 2502, the wireless device may transmit a set of communication signals, such as described in connection with FIG. 24. For example, at 2408, the first device 2402 may transmit communication signals 2408 to the second device 2404. The transmission of the set of communication signals may be performed by, e.g., the GI-FMCW generation/process component 198 of the apparatus 2704, the GI-FMCW generation/process component 199 of the network entity 2702, and/or the transceiver(s) 2722 of the network entity 2702 in FIG. 27.

In one example, the wireless device includes a UE, a component of the UE, a base station, a component of the base station, an RF sensing node, a network entity, or a node of the network entity.

At 2504, the wireless device may configure one or more parameters associated with a set of radar reference signals for radar sensing based on the set of communication signals, each radar reference signal in the set of radar reference signals including a GI, such as described in connection with FIG. 24. For example, at 2422, the first device 2402 may configure parameter(s) associated with RRSs 2410 for radar sensing based on communication signals 2408, where each of the RRSs 2410 includes a GI 2412 as shown at 2434. The configuration of the one or more parameters associated with the set of radar reference signals for radar sensing may be performed by, e.g., the GI-FMCW generation/process component 198 of the apparatus 2704 and/or the GI-FMCW generation/process component 199 of the network entity 2702 in FIG. 27.

In one example, the set of communication signals includes OFDM communication symbols and the set of radar reference signals includes FMCW symbols.

In another example, the one or more parameters include at least one of: a slope associated with the set of radar reference signals; a symbol length for each radar reference signal in the set of radar reference signals; or a duration for the GI in each radar reference signal of the set of radar reference signals. In such an example, the symbol length is equal to a length of a communication signal in the set of communication signals. In such an example, the slope is calculated based on a ratio associated with the symbol length of a first radar reference signal in the set of radar reference signals and a first bandwidth allocated for the first radar reference signal minus a second bandwidth allocated for the GI of the first radar reference signal. In such an example, the first bandwidth and the second bandwidth are integer multiples of an SCS configured for the set of communication signals. In such an example, the duration for the GI is equal to a CP length of a communication signal in the set of communication signals, or the duration for the GI is assigned a zero value. In such an example, the duration for the GI is an integer multiple of a sampling interval associated with the set of communication signals, where a maximum duration of the GI is based on a symbol duration associated with the set of communication signals and a maximum radar range specification.

In another example, the GI corresponds to a start of a radar reference signal in the set of radar reference signals or an end of the radar reference signal.

At 2506, the wireless device may transmit the set of radar reference signals associated with the one or more parameters, such as described in connection with FIG. 24. For example, at 2410, the first device 2402 may transmit RRSs 2410 associated with one or more configured parameters. The transmission of the set of radar reference signals may be performed by, e.g., the GI-FMCW generation/process component 198 of the apparatus 2704, the GI-FMCW generation/process component 199 of the network entity 2702, and/or the transceiver(s) 2722 of the network entity 2702 in FIG. 27.

At 2508, the wireless device may apply phase coding for the set of radar reference signals, where a coding rate for the phase coding is based on an SCS and a FFT size configured for the set of communication signals, such as described in connection with FIG. 24. The application of the phase coding for the set of radar reference signals may be performed by, e.g., the GI-FMCW generation/process component 198 of the apparatus 2704 and/or the GI-FMCW generation/process component 199 of the network entity 2702 of the network entity 2702 in FIG. 27.

At 2510, the wireless device may transmit information indicative of a virtual antenna port configuration associated with the wireless device, such as described in connection with FIG. 24. For example, at 2430, the first device 2402 may transmit information indicative of a virtual antenna port configuration associated with the wireless device. The transmission of the information may be performed by, e.g., the GI-FMCW generation/process component 198 of the apparatus 2704, the GI-FMCW generation/process component 199 of the network entity 2702, and/or the transceiver(s) 2722 of the network entity 2702 in FIG. 27.

In one example, if the radar sensing is associated with monostatic radar sensing, at 2512, the wireless device may transmit information indicative of at least one configuration for the set of radar reference signals, such as described in connection with FIG. 24. For example, at 2430, the first device 2402 may transmit information indicative of at least one configuration for the set of radar reference signals. The transmission of the information may be performed by, e.g., the GI-FMCW generation/process component 198 of the apparatus 2704, the GI-FMCW generation/process component 199 of the network entity 2702, and/or the transceiver(s) 2722 of the network entity 2702 in FIG. 27.

In another example, if the radar sensing is associated with monostatic radar sensing, at 2514, the wireless device may receive information indicative of at least one configuration for a second set of radar reference signals from a UE, and the wireless device may transmit the set of radar reference signals based at least in part on the information, such as described in connection with FIG. 24. For example, at 2432, the first device 2402 may receive information indicative of at least one configuration for a second set of radar reference signals from the second device 2404, and at 2424, the first device 202 may transmit the RRSs 2410 based on the information. The reception of the information may be performed by, e.g., the GI-FMCW generation/process component 198 of the apparatus 2704, the GI-FMCW generation/process component 199 of the network entity 2702, and/or the transceiver(s) 2722 of the network entity 2702 in FIG. 27.

In another example, if the radar sensing is associated with bistatic radar sensing, at 2516, the wireless device may receive information indicative of a sampling rate from a second wireless device, where the sampling rate may be associated with ADCs of the second wireless device for processing the set of radar reference signals, and the wireless device may transmit the set of radar reference signals with at least one parameter of the one or more parameters configured based on the information, such as described in connection with FIG. 24. For example, at 2432, the first device 2402 may receive information indicative of a sampling rate from the second device 2404, where the sampling rate is associated with ADCs of the second device 2404 for processing the RRSs 2410, and the first device 2402 may transmit the RRSs 2410 with at least one parameter of the one or more parameters configured based on the information. The reception of the information may be performed by, e.g., the GI-FMCW generation/process component 198 of the apparatus 2704, the GI-FMCW generation/process component 199 of the network entity 2702, and/or the transceiver(s) 2722 of the network entity 2702 in FIG. 27. In such an example, the wireless device may transmit the at least one parameter of the one or more parameters to the second wireless device prior to transmitting the set of radar reference signals. In such an example, the information is received via at least one of: DCI, UCI, SCI, or a MAC-CE.

At 2518, the wireless device may transmit the set of radar reference signals based on a beacon configuration for reception by one or more beacon receivers, such as described in connection with FIG. 24. The transmission of the set of radar reference signals based on a beacon configuration for reception by one or more beacon receivers may be performed by, e.g., the GI-FMCW generation/process component 198 of the apparatus 2704, the GI-FMCW generation/process component 199 of the network entity 2702, and/or the transceiver(s) 2722 of the network entity 2702 in FIG. 27.

In one example, the beacon configuration includes a signal pattern associated with an VRU.

Figure 26:
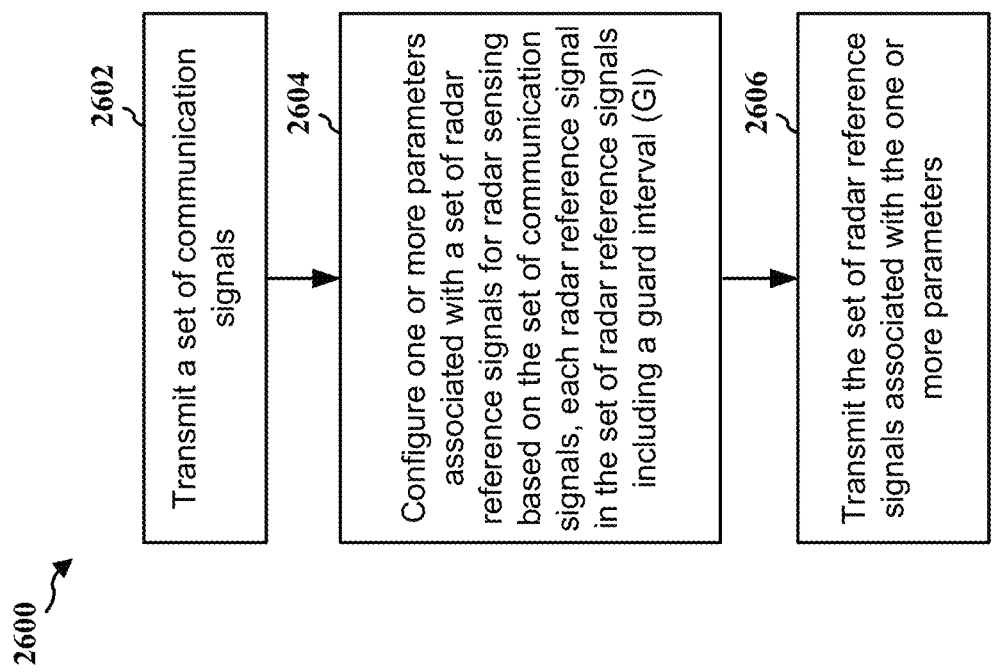
FIG. 26 is a flowchart of a method of wireless communication.

FIG. 26 is a flowchart 2600 of a method of wireless communication. The method may be performed by a wireless device (e.g., the UE 104; the base station 102; the first device 2402; the apparatus 2704; the network entity 2702). The method may enable the wireless device to configure and transmit GI-FMCW waveform for RF sensing of a joint communication-radar.

At 2602, the wireless device may transmit a set of communication signals, such as described in connection with FIG. 24. For example, at 2408, the first device 2402 may transmit communication signals 2408 to the second device 2404. The transmission of the set of communication signals may be performed by, e.g., the GI-FMCW generation/process component 198 of the apparatus 2704, the GI-FMCW generation/process component 199 of the network entity 2702, and/or the transceiver(s) 2722 of the network entity 2702 in FIG. 27.

In one example, the wireless device includes a UE, a component of the UE, a base station, a component of the base station, an RF sensing node, a network entity, or a node of the network entity.

At 2604, the wireless device may configure one or more parameters associated with a set of radar reference signals for radar sensing based on the set of communication signals, each radar reference signal in the set of radar reference signals including a GI, such as described in connection with FIG. 24. For example, at 2422, the first device 2402 may configure parameter(s) associated with RRSs 2410 for radar sensing based on communication signals 2408, where each of the RRSs 2410 includes a GI 2412 as shown at 2434. The configuration of the one or more parameters associated with the set of radar reference signals for radar sensing may be performed by, e.g., the GI-FMCW generation/process component 198 of the apparatus 2704 and/or the GI-FMCW generation/process component 199 of the network entity 2702 in FIG. 27.

In one example, the set of communication signals includes OFDM communication symbols and the set of radar reference signals includes FMCW symbols.

In another example, the one or more parameters include at least one of: a slope associated with the set of radar reference signals; a symbol length for each radar reference signal in the set of radar reference signals; or a duration for the GI in each radar reference signal of the set of radar reference signals. In such an example, the symbol length is equal to a length of a communication signal in the set of communication signals. In such an example, the slope is calculated based on a ratio associated with the symbol length of a first radar reference signal in the set of radar reference signals and a first bandwidth allocated for the first radar reference signal minus a second bandwidth allocated for the GI of the first radar reference signal. In such an example, the first bandwidth and the second bandwidth are integer multiples of an SCS configured for the set of communication signals. In such an example, the duration for the GI is equal to a CP length of a communication signal in the set of communication signals, or the duration for the GI is assigned a zero value. In such an example, the duration for the GI is an integer multiple of a sampling interval associated with the set of communication signals, where a maximum duration of the GI is based on a symbol duration associated with the set of communication signals and a maximum radar range specification.

In another example, the GI corresponds to a start of a radar reference signal in the set of radar reference signals or an end of the radar reference signal.

At 2606, the wireless device may transmit the set of radar reference signals associated with the one or more parameters, such as described in connection with FIG. 24. For example, at 2410, the first device 2402 may transmit RRSs 2410 associated with one or more configured parameters. The transmission of the set of radar reference signals may be performed by, e.g., the GI-FMCW generation/process component 198 of the apparatus 2704, the GI-FMCW generation/process component 199 of the network entity 2702, and/or the transceiver(s) 2722 of the network entity 2702 in FIG. 27.

In one example, the wireless device may apply phase coding for the set of radar reference signals, where a coding rate for the phase coding is based on an SCS and a FFT size configured for the set of communication signals, such as described in connection with FIG. 24. The application of the phase coding for the set of radar reference signals may be performed by, e.g., the GI-FMCW generation/process component 198 of the apparatus 2704 and/or the GI-FMCW generation/process component 199 of the network entity 2702 of the network entity 2702 in FIG. 27.

In another example, the wireless device may transmit information indicative of a virtual antenna port configuration associated with the wireless device, such as described in connection with FIG. 24. For example, at 2430, the first device 2402 may transmit information indicative of a virtual antenna port configuration associated with the wireless device. The transmission of the information may be performed by, e.g., the GI-FMCW generation/process component 198 of the apparatus 2704, the GI-FMCW generation/process component 199 of the network entity 2702, and/or the transceiver(s) 2722 of the network entity 2702 in FIG. 27.

In another example, if the radar sensing is associated with monostatic radar sensing, the wireless device may transmit information indicative of at least one configuration for the set of radar reference signals, such as described in connection with FIG. 24. For example, at 2430, the first device 2402 may transmit information indicative of at least one configuration for the set of radar reference signals. The transmission of the information may be performed by, e.g., the GI-FMCW generation/process component 198 of the apparatus 2704, the GI-FMCW generation/process component 199 of the network entity 2702, and/or the transceiver(s) 2722 of the network entity 2702 in FIG. 27.

In another example, if the radar sensing is associated with monostatic radar sensing, the wireless device may receive information indicative of at least one configuration for a second set of radar reference signals from a UE, and the wireless device may transmit the set of radar reference signals based at least in part on the information, such as described in connection with FIG. 24. For example, at 2432, the first device 2402 may receive information indicative of at least one configuration for a second set of radar reference signals from the second device 2404, and at 2424, the first device 202 may transmit the RRSs 2410 based on the information. The reception of the information may be performed by, e.g., the GI-FMCW generation/process component 198 of the apparatus 2704, the GI-FMCW generation/process component 199 of the network entity 2702, and/or the transceiver(s) 2722 of the network entity 2702 in FIG. 27.

In another example, if the radar sensing is associated with bistatic radar sensing, the wireless device may receive information indicative of a sampling rate from a second wireless device, where the sampling rate may be associated with ADCs of the second wireless device for processing the set of radar reference signals, and the wireless device may transmit the set of radar reference signals with at least one parameter of the one or more parameters configured based on the information, such as described in connection with FIG. 24. For example, at 2432, the first device 2402 may receive information indicative of a sampling rate from the second device 2404, where the sampling rate is associated with ADCs of the second device 2404 for processing the RRSs 2410, and the first device 2402 may transmit the RRSs 2410 with at least one parameter of the one or more parameters configured based on the information. The reception of the information may be performed by, e.g., the GI-FMCW generation/process component 198 of the apparatus 2704, the GI-FMCW generation/process component 199 of the network entity 2702, and/or the transceiver(s) 2722 of the network entity 2702 in FIG. 27. In such an example, the wireless device may transmit the at least one parameter of the one or more parameters to the second wireless device prior to transmitting the set of radar reference signals. In such an example, the information is received via at least one of: DCI, UCI, SCI, or a MAC-CE.

In another example, the wireless device may transmit the set of radar reference signals based on a beacon configuration for reception by one or more beacon receivers, such as described in connection with FIG. 24. The transmission of the set of radar reference signals based on a beacon configuration for reception by one or more beacon receivers may be performed by, e.g., the GI-FMCW generation/process component 198 of the apparatus 2704, the GI-FMCW generation/process component 199 of the network entity 2702, and/or the transceiver(s) 2722 of the network entity 2702 in FIG. 27.

In one example, the beacon configuration includes a signal pattern associated with an VRU.

FIG. 27 is a diagram 2700 illustrating an example of a hardware implementation for an apparatus 2704. The apparatus 2704 may be a UE, a component of a UE, or may implement UE functionality. In some aspects, the apparatus 2704 may include a cellular baseband processor 2724 (also referred to as a modem) coupled to one or more transceivers 2722 (e.g., cellular RF transceiver). The cellular baseband processor 2724 may include on-chip memory 2724'. In some aspects, the apparatus 2704 may further include one or more subscriber identity modules (SIM) cards 2720 and an application processor 2706 coupled to a secure digital (SD) card 2708 and a screen 2710. The application processor 2706 may include on-chip memory 2706'. In some aspects, the apparatus 2704 may further include a Bluetooth module 2712, a WLAN module 2714, an SPS module 2716 (e.g., GNSS module), one or more sensor modules 2718 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2726, a power supply 2730, and/or a camera 2732. The Bluetooth module 2712, the WLAN module 2714, and the SPS module 2716 may include an on-chip transceiver (TRX) (or in some cases, just a receiver (RX)). The Bluetooth module 2712, the WLAN module 2714, and the SPS module 2716 may include their own dedicated antennas and/or utilize the antennas 2780 for communication. The cellular baseband processor 2724 communicates through the transceiver(s) 2722 via one or more antennas 2780 with the UE 104 and/or with an RU associated with a network entity 2702. The cellular baseband processor 2724 and the application processor 2706 may each include a computer-readable medium/memory 2724', 2706', respectively. The additional memory modules 2726 may also be considered a computer-readable medium/memory. Each computer-readable medium/memory 2724', 2706', additional memory modules 2726 may be non-transitory. The cellular baseband processor 2724 and the application processor 2706 are each responsible for general processing, including the execution of software stored on the computer-readable medium/memory. The software, when executed by the cellular baseband processor 2724/application processor 2706, causes the cellular baseband processor 2724/application processor 2706 to perform the various functions described supra. The computer-readable medium/memory may also be used for storing data that is manipulated by the cellular baseband processor 2724/application processor 2706 when executing software. The cellular baseband processor 2724/application processor 2706 may be a component of the UE 350 and may include the memory 360 and/or at least one of the TX processor 368, the RX processor 356, and the controller/processor 359. In one configuration, the apparatus 2704 may be a processor chip (modem and/or application) and include just the cellular baseband processor 2724 and/or the application processor 2706, and in another configuration, the apparatus 2704 may be the entire UE (e.g., see 350 of FIG. 3) and include the additional modules of the apparatus 2704.

As discussed supra, the GI-FMCW generation/process component 198/199 is configured to transmit a set of communication signals; configure one or more parameters associated with a set of radar reference signals for radar sensing based on the set of communication signals, each radar reference signal in the set of radar reference signals including a GI; and transmit the set of radar reference signals associated with the one or more parameters. The GI-FMCW generation/process component 198/199 may be within the cellular baseband processor 2724, the application processor 2706, or both the cellular baseband processor 2724 and the application processor 2706. The GI-FMCW generation/process component 198/199 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 2704 may include a variety of components configured for various functions. In one configuration, the apparatus 2704, and in particular the cellular baseband processor 2724 and/or the application processor 2706, includes means for transmitting a set of communication signals; means for configuring one or more parameters associated with a set of radar reference signals for radar sensing based on the set of communication signals, each radar reference signal in the set of radar reference signals including a GI; means for transmitting the set of radar reference signals associated with the one or more parameters; means for applying phase coding for the set of radar reference signals, where a coding rate for the phase coding is based on an SCS and a FFT size configured for the set of communication signals; means for transmitting information indicative of a virtual antenna port configuration associated with the wireless device; means for transmitting information indicative of at least one configuration for the set of radar reference signals; means for receiving information indicative of at least one configuration for a second set of radar reference signals from a UE; means for receiving information indicative of a sampling rate from a second wireless device, where the sampling rate is associated with ADCs of the second wireless device for processing the set of radar reference signals; means for transmitting the at least one parameter of the one or more parameters to the second wireless device prior to transmitting the set of radar reference signals; and/or means for transmit the set of radar reference signals based on a beacon configuration for reception by one or more beacon receivers.

In some examples, the means may be the GI-FMCW generation/process component 198 of the apparatus 2704 or configured to perform the functions recited by the means. As described supra, the apparatus 2704 may include the TX processor 368, the RX processor 356, and the controller/processor 359. As such, in one configuration, the means may be the TX processor 368, the RX processor 356, and/or the controller/processor 359 configured to perform the functions recited by the means. In other examples, the means may be the GI-FMCW generation/process component 199 of the network entity 2702 configured to perform the functions recited by the means. As described supra, the network entity 2702 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is an apparatus for wireless communication including a memory; at least one transceiver; and at least one processor communicatively connected to the memory and the at least one transceiver, the at least one processor configured to: transmit a set of communication signals; configure one or more parameters associated with a set of radar reference signals for radar sensing based on the set of communication signals, each radar reference signal in the set of radar reference signals including a GI; and transmit the set of radar reference signals associated with the one or more parameters.

Aspect 2 is the apparatus of aspect 1, where the wireless device includes a UE, a component of the UE, a base station, a component of the base station, an RF sensing node, a network entity, or a node of the network entity.

Aspect 3 is the apparatus of any of aspects 1 and 2, where the set of communication signals includes OFDM communication symbols and the set of radar reference signals includes FMCW symbols.

Aspect 4 is the apparatus of any of aspects 1 to 3, where the one or more parameters include at least one of: a slope associated with the set of radar reference signals; a symbol length for each radar reference signal in the set of radar reference signals; or a duration for the GI in each radar reference signal of the set of radar reference signals.

Aspect 5 is the apparatus of any of aspects 1 to 4, where the symbol length is equal to a length of a communication signal in the set of communication signals.

Aspect 6 is the apparatus of any of aspects 1 to 5, where the slope is calculated based on a ratio associated with the symbol length of a first radar reference signal in the set of radar reference signals and a first bandwidth allocated for the first radar reference signal minus a second bandwidth allocated for the GI of the first radar reference signal.

Aspect 7 is the apparatus of any of aspects 1 to 6, where the first bandwidth and the second bandwidth are integer multiples of an SCS configured for the set of communication signals.

Aspect 8 is the apparatus of any of aspects 1 to 7, where the duration for the GI is equal to a CP length of a communication signal in the set of communication signals, or the duration for the GI is assigned a zero value.

Aspect 9 is the apparatus of any of aspects 1 to 8, where the duration for the GI is an integer multiple of a sampling interval associated with the set of communication signals, where a maximum duration of the GI is based on a symbol duration associated with the set of communication signals and a maximum radar range specification.

Aspect 10 is the apparatus of any of aspects 1 to 9, where the GI corresponds to a start of a radar reference signal in the set of radar reference signals or an end of the radar reference signal.

Aspect 11 is the apparatus of any of aspects 1 to 10, where the at least one processor is further configured to: apply phase coding for the set of radar reference signals, where a coding rate for the phase coding is based on an SCS and a FFT size configured for the set of communication signals.

Aspect 12 is the apparatus of any of aspects 1 to 11, where the at least one processor is further configured to: transmit information indicative of a virtual antenna port configuration associated with the wireless device.

Aspect 13 is the apparatus of any of aspects 1 to 12, where the radar sensing is associated with monostatic radar sensing, and the at least one processor is further configured to: transmit information indicative of at least one configuration for the set of radar reference signals.

Aspect 14 is the apparatus of any of aspects 1 to 13, where the radar sensing is associated with monostatic radar sensing, and the at least one processor is further configured to: receive information indicative of at least one configuration for a second set of radar reference signals from a UE; and transmit the set of radar reference signals based at least in part on the information.

Aspect 15 is the apparatus of any of aspects 1 to 14, where the radar sensing is associated with bistatic radar sensing or multi-static radar sensing, and the at least one processor is further configured to: receive information indicative of a sampling rate from a second wireless device, where the sampling rate is associated with ADCs of the second wireless device for processing the set of radar reference signals; and transmit the set of radar reference signals with at least one parameter of the one or more parameters configured based on the information.

Aspect 16 is the apparatus of any of aspects 1 to 15, where the at least one processor is further configured to: transmit the at least one parameter of the one or more parameters to the second wireless device prior to transmitting the set of radar reference signals.

Aspect 17 is the apparatus of any of aspects 1 to 16, where the information is received via at least one of: DCI, UCI, SCI, or a MAC-CE.

Aspect 18 is the apparatus of any of aspects 1 to 17, where the at least one processor is further configured to: transmit the set of radar reference signals based on a beacon configuration for reception by one or more beacon receivers.

Aspect 19 is the apparatus of any of aspects 1 to 18, where the beacon configuration includes a signal pattern associated with an VRU.

Aspect 20 is a method of wireless communication for implementing any of aspects 1 to 19.

Aspect 21 is an apparatus for wireless communication including means for implementing any of aspects 1 to 19.

Aspect 22 is a computer-readable medium storing computer executable code, where the code when executed by a processor causes the processor to implement any of aspects 1 to 19.

What is claimed is:

1. An apparatus for wireless communication at a wireless device, comprising:
   memory;
   at least one transceiver; and
   at least one processor communicatively connected to the memory and the at least one transceiver, the at least one processor configured to:
   transmit a set of communication signals;
   configure one or more parameters associated with a set of radar reference signals for radar sensing based on the set of communication signals, each radar reference signal in the set of radar reference signals including a guard interval (GI), wherein a duration for the GI is an integer multiple of a sampling interval associated with the set of communication signals, wherein a maximum duration of the GI is based on a symbol duration associated with the set of communication signals and a maximum radar range specification; and
   transmit the set of radar reference signals associated with the one or more parameters.

2. The apparatus of claim 1, wherein the wireless device includes a user equipment (UE), a component of the UE, a base station, a component of the base station, a radio frequency (RF) sensing node, a network entity, or a node of the network entity.

3. The apparatus of claim 1, wherein the set of communication signals comprises orthogonal frequency-division multiplexing (OFDM) communication symbols and the set of radar reference signals comprises frequency-modulated continuous-wave (FMCW) symbols.

4. The apparatus of claim 1, wherein the one or more parameters include at least one of:

a slope associated with the set of radar reference signals;
a symbol length for each radar reference signal in the set of radar reference signals; or
the duration for the GI in each radar reference signal of the set of radar reference signals.

5. The apparatus of claim 4, wherein the symbol length is equal to a length of a communication signal in the set of communication signals.

6. The apparatus of claim 4, wherein the slope is calculated based on a ratio associated with the symbol length of a first radar reference signal in the set of radar reference signals and a first bandwidth allocated for the first radar reference signal minus a second bandwidth allocated for the GI of the first radar reference signal.

7. The apparatus of claim 6, wherein the first bandwidth and the second bandwidth are integer multiples of a subcarrier spacing (SCS) configured for the set of communication signals.

8. The apparatus of claim 4, wherein the duration for the GI is equal to a cyclic prefix (CP) length of a communication signal in the set of communication signals, or the duration for the GI is assigned a zero value.

9. The apparatus of claim 1, wherein the GI corresponds to a start of a radar reference signal in the set of radar reference signals or an end of the radar reference signal.

10. The apparatus of claim 1, wherein the at least one processor is further configured to:
apply phase coding for the set of radar reference signals, wherein a coding rate for the phase coding is based on a subcarrier spacing (SCS) and a fast Fourier transform (FFT) size configured for the set of communication signals.

11. The apparatus of claim 1, wherein the at least one processor is further configured to:
transmit information indicative of a virtual antenna port configuration associated with the wireless device.

12. The apparatus of claim 1, wherein the radar sensing is associated with monostatic radar sensing, and the at least one processor is further configured to:
transmit information indicative of at least one configuration for the set of radar reference signals.

13. The apparatus of claim 1, wherein the radar sensing is associated with monostatic radar sensing, and the at least one processor is further configured to:
receive information indicative of at least one configuration for a second set of radar reference signals from a UE; and
transmit the set of radar reference signals based at least in part on the information.

14. The apparatus of claim 1, wherein the radar sensing is associated with bistatic radar sensing or multi-static radar sensing, and the at least one processor is further configured to:
receive information indicative of a sampling rate from a second wireless device, wherein the sampling rate is associated with analog-to-digital converters (ADCs) of the second wireless device for processing the set of radar reference signals; and
transmit the set of radar reference signals with at least one parameter of the one or more parameters configured based on the information.

15. The apparatus of claim 14, wherein the at least one processor is further configured to:
transmit the at least one parameter of the one or more parameters to the second wireless device prior to transmitting the set of radar reference signals.

16. The apparatus of claim 14, wherein to receive the information, the at least one processor is configured to receive the information via at least one of: downlink control information (DCI), uplink control information (UCI), sidelink control information (SCI), or a medium access control (MAC)-control element (CE) (MAC-CE).

17. The apparatus of claim 1, wherein the at least one processor is further configured to:
transmit the set of radar reference signals based on a beacon configuration for reception by one or more beacon receivers.

18. The apparatus of claim 17, wherein the beacon configuration comprises a signal pattern associated with a vulnerable road user (VRU).

19. A method of wireless communication at a wireless device, comprising:
transmitting a set of communication signals;
configuring one or more parameters associated with a set of radar reference signals for radar sensing based on the set of communication signals, each radar reference signal in the set of radar reference signals including a guard interval (GI), wherein a duration for the GI is an integer multiple of a sampling interval associated with the set of communication signals, wherein a maximum duration of the GI is based on a symbol duration associated with the set of communication signals and a maximum radar range specification; and
transmitting the set of radar reference signals associated with the one or more parameters.

20. The method of claim 19, wherein the set of communication signals comprises orthogonal frequency-division multiplexing (OFDM) communication symbols and the set of radar reference signals comprises frequency-modulated continuous-wave (FMCW) symbols.

21. The method of claim 19, wherein the one or more parameters include at least one of:
a slope associated with the set of radar reference signals;
a symbol length for each radar reference signal in the set of radar reference signals; or
the duration for the GI in each radar reference signal of the set of radar reference signals.

22. The method of claim 19, further comprising:
applying phase coding for the set of radar reference signals, wherein a coding rate for the phase coding is based on a subcarrier spacing (SCS) and a fast Fourier transform (FFT) size configured for the set of communication signals.

23. The method of claim 19, further comprising:
transmitting information indicative of a virtual antenna port configuration associated with the wireless device.

24. The method of claim 19, wherein the radar sensing is associated with monostatic radar sensing, and the method further comprises:
transmitting information indicative of at least one configuration for the set of radar reference signals.

25. The method of claim 19, wherein the radar sensing is associated with monostatic radar sensing, and the method further comprises:
receive information indicative of at least one configuration for a second set of radar reference signals from a UE; and
transmit the set of radar reference signals based at least in part on the information.

26. The method of claim 19, wherein the radar sensing is associated with bistatic radar sensing or multi-static radar sensing, and the method further comprises:

receive information indicative of a sampling rate from a second wireless device, wherein the sampling rate is associated with analog-to-digital converters (ADCs) of the second wireless device for processing the set of radar reference signals; and transmit the set of radar reference signals with at least one parameter of the one or more parameters configured based on the information.

27. The method of claim 19, further comprising:

transmit the set of radar reference signals based on a beacon configuration for reception by one or more beacon receivers.

28. An apparatus for wireless communication at a wireless device, comprising:

means for transmitting a set of communication signals;

means for configuring one or more parameters associated with a set of radar reference signals for radar sensing based on the set of communication signals, each radar reference signal in the set of radar reference signals including a guard interval (GI), wherein a duration for the GI is an integer multiple of a sampling interval associated with the set of communication signals, wherein a maximum duration of the GI is based on a symbol duration associated with the set of communication signals and a maximum radar range specification; and means for transmitting the set of radar reference signals associated with the one or more parameters.

29. A non-transitory computer-readable medium storing computer executable code at a wireless device, the code when executed by a processor causes the processor to:

transmit a set of communication signals;

configure one or more parameters associated with a set of radar reference signals for radar sensing based on the set of communication signals, each radar reference signal in the set of radar reference signals including a guard interval (GI), wherein a duration for the GI is an integer multiple of a sampling interval associated with the set of communication signals, wherein a maximum duration of the GI is based on a symbol duration associated with the set of communication signals and a maximum radar range specification; and transmit the set of radar reference signals associated with the one or more parameters.

\* \* \* \* \*